United States Patent
Jong et al.

(10) Patent No.: US 11,601,049 B2
(45) Date of Patent: *Mar. 7, 2023

(54) MULTI-PHASE HYBRID CONVERTER

(71) Applicant: Analog Devices, Inc., Wilmington, MA (US)

(72) Inventors: Owen Jong, San Jose, CA (US); Ya Liu, Sunnyvale, CA (US); Yingyi Yan, Fremont, CA (US); Jindong Zhang, Fremont, CA (US)

(73) Assignee: Analog Devices, Inc., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/375,830

(22) Filed: Jul. 14, 2021

(65) Prior Publication Data
US 2022/0231601 A1 Jul. 21, 2022

Related U.S. Application Data

(63) Continuation-in-part of application No. 17/248,289, filed on Jan. 19, 2021, and a continuation-in-part of application No. 17/152,065, filed on Jan. 19, 2021.

(51) Int. Cl.
*H02M 3/07* (2006.01)
*H02M 1/00* (2006.01)
*H02M 3/158* (2006.01)

(52) U.S. Cl.
CPC ........... *H02M 3/07* (2013.01); *H02M 1/0095* (2021.05); *H02M 3/1584* (2013.01)

(58) Field of Classification Search
CPC ............. H02M 1/0095; H02M 3/1584; H02M 1/0025; H02M 3/158; H02M 1/0022; H02M 1/0016
See application file for complete search history.

(56) References Cited

U.S. PATENT DOCUMENTS 6,903,536 B2 6/2005 Yang
7,230,405 B2 6/2007 Jang et al.
(Continued)

FOREIGN PATENT DOCUMENTS

CN 103280974 9/2015
CN 108462394 8/2018
(Continued)

OTHER PUBLICATIONS

"LTC7821: Hybrid Step-Down Synchronous Controller", Analog Devices Data Sheet, (Apr. 2018), 36 pgs.
(Continued)

*Primary Examiner* — Alex Torres-Rivera
(74) *Attorney, Agent, or Firm* — Schwegman Lundberg & Woessner, P.A.

(57) ABSTRACT

A multi-phase hybrid DC-DC converter using a switched-capacitor technique is described. The multi-phase hybrid converter can reduce the volt-seconds on the inductors of the converter, which can allow for a reduction in the size of the inductors. In addition, the multi-phase hybrid converter can utilize inductors as current sources to charge and discharge the flying capacitors, which can reduce the size of the mid capacitor and increase solution density. Because charging and discharging are performed by inductors, the multi-phase hybrid converter can eliminate the capacitor-to-capacitor charge transfer. As such, the multi-phase hybrid converter does not need high capacitance to achieve high efficiency operation, which can further increase solution density.

19 Claims, 13 Drawing Sheets

(56) References Cited

U.S. PATENT DOCUMENTS

| | | | |
|---|---|---|---|
| 7,733,072 | B2 | 6/2010 | Kanakubo |
| 7,746,041 | B2 | 6/2010 | Xu et al. |
| 7,782,027 | B2 | 8/2010 | Williams |
| 7,952,337 | B2 | 5/2011 | Gurcan |
| 7,969,129 | B2 | 6/2011 | Kudo |
| 8,854,019 | B1 | 10/2014 | Levesque et al. |
| 9,024,600 | B2 | 5/2015 | Wiktor et al. |
| 9,136,756 | B2 | 9/2015 | Liu |
| 9,295,116 | B2 | 3/2016 | Sanders et al. |
| 9,362,832 | B2 | 6/2016 | Karlsson et al. |
| 9,484,799 | B2 | 11/2016 | Zhang et al. |
| 9,600,062 | B2 | 3/2017 | Kumar |
| 9,653,996 | B2 | 5/2017 | Parto et al. |
| 9,793,794 | B2 | 10/2017 | Stauth et al. |
| 9,966,842 | B1 | 5/2018 | Jiang et al. |
| 10,063,147 | B2 | 8/2018 | Hoyerby |
| 10,075,073 | B2 | 9/2018 | Guan et al. |
| 10,498,236 | B2 | 12/2019 | Liu et al. |
| 10,505,445 | B2 | 12/2019 | Oh |
| 10,541,623 | B1 | 1/2020 | Michal |
| 10,547,241 | B1 | 1/2020 | Li et al. |
| 10,601,324 | B1 | 3/2020 | Kudva et al. |
| 10,615,697 | B1* | 4/2020 | Ferrari ............... H02M 3/18 |
| 10,698,430 | B2 | 6/2020 | Thenus et al. |
| 10,756,624 | B2 | 8/2020 | Mauri |
| 10,833,661 | B1 | 11/2020 | Archibald et al. |
| 2006/0103364 | A1* | 5/2006 | Adragna ............ H02M 1/4225 |
| | | | 323/282 |
| 2008/0247194 | A1 | 10/2008 | Ying et al. |
| 2014/0346962 | A1 | 11/2014 | Sanders et al. |
| 2015/0062108 | A1 | 3/2015 | Archibald |
| 2016/0336855 | A1 | 11/2016 | Ozanoglu et al. |
| 2017/0085183 | A1 | 3/2017 | Notsch |
| 2017/0201177 | A1 | 7/2017 | Kesarwani et al. |
| 2018/0294717 | A1 | 10/2018 | Zhang et al. |
| 2019/0348913 | A1 | 11/2019 | Zhang et al. |
| 2020/0091817 | A1 | 3/2020 | Teplechuk et al. |
| 2020/0212795 | A1 | 7/2020 | Das et al. |
| 2020/0259418 | A1 | 8/2020 | Higaki et al. |
| 2020/0321860 | A1 | 10/2020 | Amin et al. |
| 2021/0083573 | A1 | 3/2021 | Yen et al. |
| 2021/0184586 | A1* | 6/2021 | Jin ..................... H02M 3/01 |
| 2022/0029540 | A1* | 1/2022 | Zhang ............... H02M 1/0095 |
| 2022/0115953 | A1* | 4/2022 | Rainer .............. H02M 1/0058 |
| 2022/0231600 | A1 | 7/2022 | Jong et al. |
| 2022/0231618 | A1 | 7/2022 | Yan et al. |

FOREIGN PATENT DOCUMENTS

| | | |
|---|---|---|
| CN | 108574411 A | 9/2018 |
| CN | 109004832 A | 12/2018 |
| CN | 109728718 A | 5/2019 |
| CN | 110224599 | 9/2019 |
| CN | 110545039 | 12/2019 |
| CN | 110581667 A | 12/2019 |
| CN | 110649814 A | 1/2020 |
| CN | 114825911 A | 7/2022 |
| CN | 114825926 A | 7/2022 |
| EP | 3734825 A1 | 11/2020 |
| FR | 2996698 A1 | 4/2014 |
| JP | 5937442 B2 | 5/2016 |
| JP | 6394030 | 9/2018 |
| KR | 101710537 B1 | 3/2017 |
| TW | 200608678 | 3/2006 |
| TW | 201810908 A | 3/2018 |
| WO | WO-2020112207 A2 | 6/2020 |

OTHER PUBLICATIONS

Carvalho, Samuel Da Silva, "Digital PWM for Multi-Level Flying Capacitor Converters with Improved Output Resolution and Flying Capacitor Voltage Controller Stability", IEEE 19th Workshop on Control and Modeling for Power Electronics (COMPEL), (2018), 7 pgs.

Lang, Bastian, "Solving the Power Density Challenge", Bodo's Power Systems, (Mar. 2020), 2 pgs.

Seo, Gabu-Su, "A 95%-Efficient 48V-to-1V 10A VRM Hybrid Converter Using Interleaved Dual Inductors", 2018 IEEE Energy Conversion Congress and Exposition (ECCE), pp. 3825-3830, (Oct. 7, 2018), 6 pgs.

U.S. Appl. No. 17/152,065, filed Jan. 19, 2021, Dual-Phase Hybrid Converter.

U.S. Appl. No. 17/248,289, filed Jan. 19, 2021, Pulse Width Modulation Controllers for Hybrid Converters.

Amin, Sally Safwat, et al., "A Fully Integrated Li-Ion-Compatible Hybrid Four-Level DC-DC Converter in 28-nm FDSOI", IEEE Journal of Solid-State Circuits, 54(3), (Mar. 2019), 720-732.

Carvalho, Samuel De Silva, et al., "A Low-Volume Multi-Phase Interleaved Dc-Dc Converter for High Step-Down Applications with Auto-Balancing of Phase Currents", IEEE Applied Power Electronics Conference and Exposition (APEC), (2017), 142-148.

Lei, Yutian, et al., "An Analytical Method to Evaluate Flying Capacitor Multilevel Converters and Hybrid Switched-Capacitor Converters for Large Voltage Conversion Ratios", IEEE 16th Workshop on Control and Modeling for Power Electronics (COMPEL), (2015), 7 pgs.

Saggini, Stefano, et al., "A 99 Percent Efficient Dual-Phase Resonant Switched-Capacitor-Buck Converter for 48 V Data Center Bus Conversions", IEEE Applied Power Electronics Conference and Exposition (APEC), (2019), 482-487.

"U.S. Appl. No. 17/152,065, Non Final Office Action dated Jul. 7, 2022", 10 pgs.

"U.S. Appl. No. 17/152,065, Response filed Jun. 16, 2022 to Restriction Requirement dated Jun. 13, 2022", 9 pgs.

"U.S. Appl. No. 17/152,065, Response filed Oct. 3, 2022 to Non Final Office Action dated Jul. 7, 2022", 12 pgs.

"U.S. Appl. No. 17/152,065, Restriction Requirement dated Jun. 13, 2022", 6 pgs.

"U.S. Appl. No. 17/248,289, Non Final Office Action dated Jun. 9, 2022", 14 pgs.

"U.S. Appl. No. 17/248,289, Notice of Allowance dated Sep. 21, 2022", 11 pgs.

"U.S. Appl. No. 17/248,289, Response filed Sep. 6, 2022 to Non Final Office Action dated Jun. 9, 2022", 10 pgs.

"U.S. Appl. No. 17/248,289, Supplemental Notice of Allowability dated Oct. 13, 2022", 3 pgs.

"European Application Serial No. 21215787.9, Extended European Search Report dated Jun. 9, 2022", 8 pgs.

"European Application Serial No. 21215788.7, Extended European Search Report dated Jun. 7, 2022", 11 pgs.

"Taiwanese Application Serial No. 111101218, Office Action dated Sep. 5, 2022", W/O English Translation, 9 pgs.

Halamicek, Michael, et al., "Cross-Coupled Series-Capacitor Quadruple Step-Down Buck Converter", IEEE Applied Power Electronics Conference and Exposition (APEC), IEEE, (Mar. 15, 2020), 1-6.

Li, Cheng, et al., "A Novel Hybrid 4:1 Step Down Converter Using an Autotransformer with DC Winding Current", IEEE Energy Conversion Congress and Exposition (ECCE), IEEE, (Oct. 11, 2020), 173-180.

Wang, Chuang, et al., "A Two-Phase Three-Level Buck DC-DC Converter With X-Connected Flying Capacitors for Current Balancing", IEEE Solid-State Circuits Letters, IEEE, vol. 3, (Sep. 22, 2020), 442-445.

"Taiwanese Application Serial No. 111101219, Office Action dated Nov. 2, 2022", 6 pgs.

"U.S. Appl. No. 17/152,065, Notice of Allowance dated Oct. 26, 2022", 9 pgs.

"U.S. Appl. No. 17/152,065, Corrected Notice of Allowability dated Nov. 17, 2022", 4 pgs.

"U.S. Appl. No. 17/248,289, Supplemental Notice of Allowability dated Nov. 23, 2022", 3 pgs.

"U.S. Appl. No. 17/152,065, Corrected Notice of Allowability dated Nov. 30, 2022", 2 pgs.

(56) References Cited

OTHER PUBLICATIONS

"European Application Serial No. 21215787.9, Response filed Dec. 14, 2022 to Extended European Search Report dated Jun. 9, 2022", 18 pgs.

"U.S. Appl. No. 17/248,289, Supplemental Notice of Allowability dated Jan. 6, 2023", 3 pgs.

"European Application Serial No. 21215788.7, Response filed Jan. 5, 2023 to Extended European Search Report dated Jun. 7, 2022", 19 pgs.

* cited by examiner

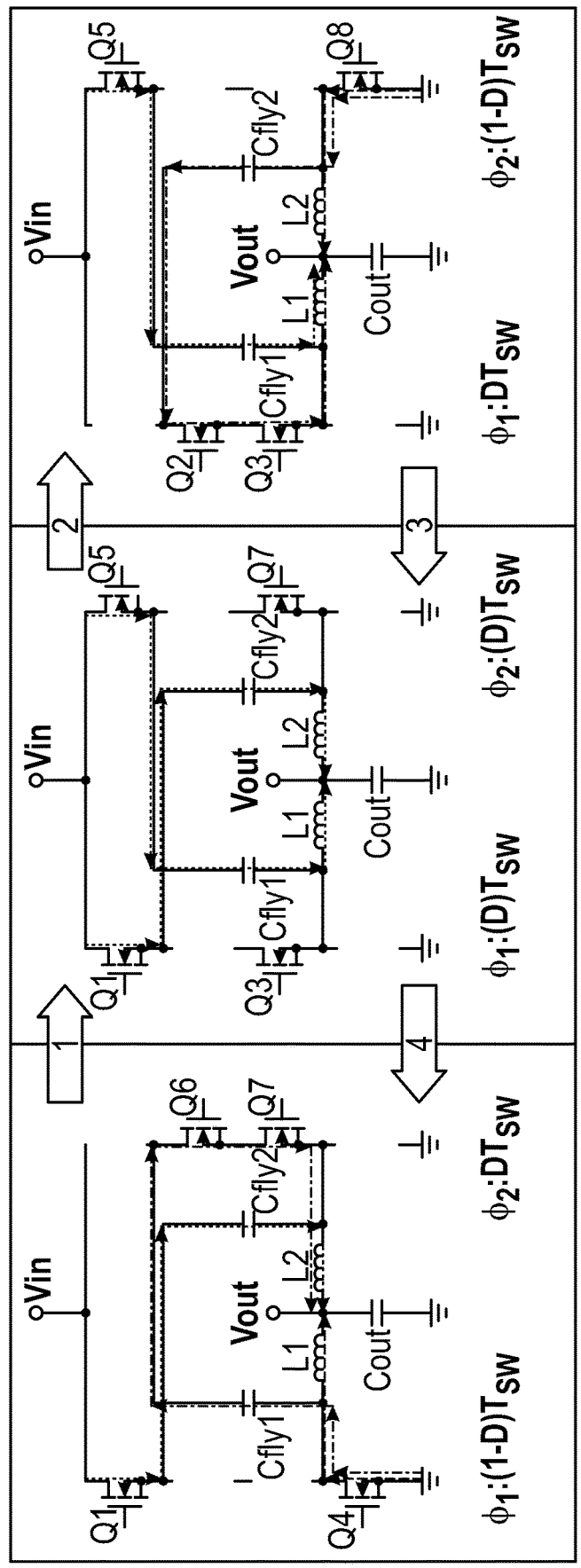

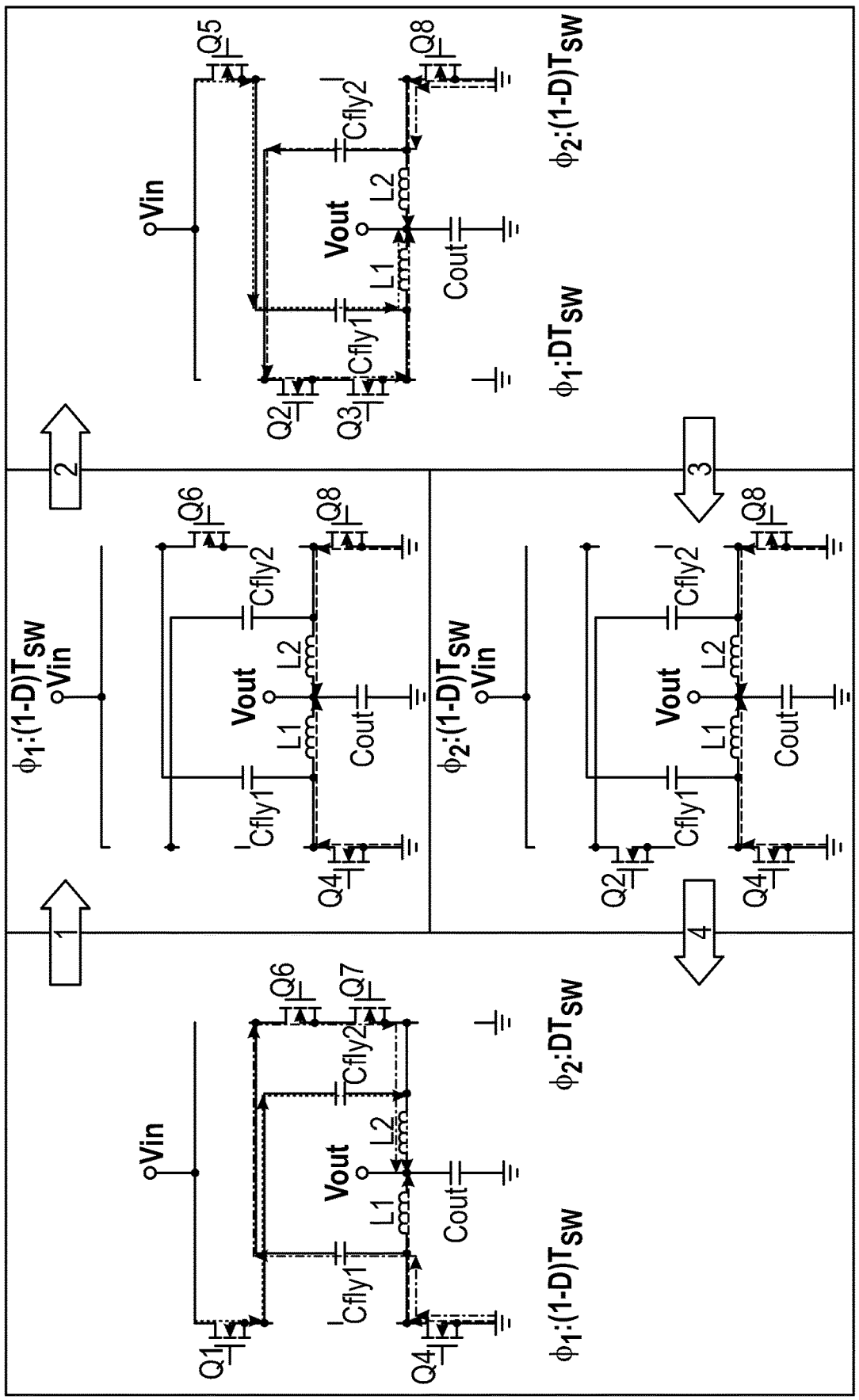

MULTI-PHASE HYBRID CONVERTER

CLAIM OF PRIORITY

This application is continuation-in-part of U.S. patent application Ser. No. 17/152,065, titled "DUAL-PHASE HYBRID CONVERTER" to Owen Jong et al., filed on Jan. 19, 2021, and claims the benefit of priority of U.S. patent application Ser. No. 17/248,289, titled "PULSE WIDTH MODULATION CONTROLLERS FOR HYBRID CONVERTERS" to Yingyi Yan et al., filed on Jan. 19, 2021, the entire contents of each being incorporated herein by reference.

FIELD OF THE DISCLOSURE

This document pertains generally, but not by way of limitation, to power convener circuits.

BACKGROUND

Hybrid power converter circuits provide efficient power solutions for power supply design. A hybrid power converter circuit is a type of power converter that provides direct current to direct current (DC-DC) voltage conversion based on switched capacitor converters and inductor-based converters. A hybrid power converter contains one or more switching elements (e.g., one or more transistors) and reactive elements (e.g., capacitors and inductors) that, in connection with a periodic switching of the switching elements provides DC output voltage.

SUMMARY OF THE DISCLOSURE

This disclosure describes a multi-phase hybrid DC-DC converter circuit topology, including dual-phase hybrid DC-DC converter circuits and N-phase hybrid DC-DC converter circuits (also referred to as a "hybrid converter" in this disclosure) using a switched-capacitor technique. The multi-phase hybrid convener of this disclosure can reduce the volt-seconds on the inductors of the converter, which can allow for a reduction in the size of the inductors. In addition, the multi-phase hybrid converter can utilize inductors as current sources to charge and discharge the flying capacitors (similar to ideal lossless charge transfer), which can reduce the size of the mid capacitor and increase solution density. Because charging and discharging are performed by inductors, the multi-phase hybrid converter of this disclosure can eliminate the capacitor-to-capacitor charge transfer. As such, the multi-phase hybrid converter does not need high capacitance to achieve high efficiency operation, which can further increase solution density. Finally, by using an inventive gate driving technique, the multi-phase hybrid converter can operate at a higher duty cycle than other approaches.

In some aspects, this disclosure is directed to a multi-phase hybrid converter comprising: a first switched-capacitor circuit including a first switching element, a second switching element, and a first capacitor; a first switching converter circuit including a third switching element, a fourth switching element, and a first inductor, wherein the second switching element is coupled with the third switching element; a second switched-capacitor circuit including a fifth switching element, a sixth switching element, and a second capacitor; a second switching converter circuit including a seventh switching element, an eighth switching element, and a second inductor, wherein the sixth switching element is coupled with the seventh switching element; and a control circuit to control operation of the first switching converter circuit using a first timing phase and control operation of the second switching converter circuit using a second timing phase, wherein the first capacitor is cross-coupled between the first switched-capacitor circuit and the second switching converter circuit.

In some aspects, this disclosure is directed to a method of operating a multi-phase hybrid converter, the method comprising: generating complementary first control signals to turn ON and OFF switching elements of a first switching converter circuit, wherein a first timing phase includes the complementary first control signals; generating complementary second control signals to turn ON and OFF switching elements of a second switching converter circuit, wherein a second timing phase includes the complementary second control signals; generating, using one of the complementary first control signals and one of the complementary second control signals, third control signals to turn ON and OFF switching elements of a first switched-capacitor circuit and a second switched-capacitor circuit; applying, according to a switching cycle having a switching frequency and a duty cycle, the complementary first control signals, the complementary second control signals, and the third control signals, the switching cycle including the first timing phase and the second timing phase; generating a series of pulses by the first switching converter circuit, the second switching converter circuit, the first switched-capacitor circuit, and the second switched-capacitor circuit, to at least one LC circuit including at least one capacitor and at least one inductor; adjusting the duty cycle of switching signals to adjust the series of pulses to set an output voltage across an output capacitor; and providing the output voltage across the output capacitor as an output voltage of the multi-phase hybrid converter.

In some aspects, this disclosure is directed to a multi-phase hybrid converter comprising: a first switched-capacitor circuit including a first switching element, a second switching element, and a first capacitor; a first switching converter circuit including a third switching element, a fourth switching element, and a first inductor, wherein the second switching element is coupled with the third switching element; a second switched-capacitor circuit including a fifth switching element, a sixth switching element, and a second capacitor; a second switching converter circuit including a seventh switching element, an eighth switching element, and a second inductor, wherein the sixth switching element is coupled with the seventh switching element; and a control circuit to control operation of the first switching converter circuit using a first timing phase and control operation of the second switching converter circuit using a second timing phase, the control circuit to: generate complementary first control signals to turn ON and OFF switching elements of the first switching converter circuit; generate complementary second control signals to turn ON and OFF switching elements of the second switching converter circuit; and generate, using one of the complementary first control signals and one of the complementary second control signals, third control signals to turn ON and OFF switching elements of a first switched-capacitor circuit and a second switched-capacitor circuit.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 6A is a schematic diagram of an example of a first operating phase of the dual-phase hybrid converter of FIG. 1 for a duty cycle greater than 50%.

FIG. 6B is a schematic diagram of an example of a second operating phase of the dual-phase hybrid converter of FIG. 1 for a duty cycle greater than 50%.

FIG. 6C is a schematic diagram of an example of a third operating phase of the dual-phase hybrid converter of FIG. 1 for a duty cycle greater than 50%.

FIG. 12A is a schematic diagram of another example of a first operating phase of the dual-phase hybrid converter of FIG. 1 for a duty cycle less than 50%.

FIG. 12B is a schematic diagram of another example of a second operating phase of the dual-phase hybrid converter of FIG. 1 for a duty cycle less than 50%.

FIG. 12C is a schematic diagram of another example of a third operating phase of the dual-phase hybrid converter of FIG. 1 for a duty cycle less than 50%.

FIG. 12D is a schematic diagram of another example of a fourth operating phase of the dual-phase hybrid converter of FIG. 1 for a duty cycle less than 50%.

DETAILED DESCRIPTION

This disclosure describes a multi-phase hybrid DC-DC converter circuit topology, including dual-phase hybrid DC-DC converter circuits and N-phase hybrid DC-DC converter circuits (also referred to as a "hybrid converter" in this disclosure) using a switched-capacitor technique. The multi-phase hybrid converter of this disclosure can reduce the volt-seconds on the inductors of the converter, which can allow for a reduction in the size of the inductors. In addition, the multi-phase hybrid converter can utilize inductors as current sources to charge and discharge the flying capacitors (similar to ideal lossless charge transfer), which can reduce the size of the mid capacitor and increase solution density. Because charging and discharging are performed by inductors, the multi-phase hybrid converter of this disclosure can eliminate the capacitor-to-capacitor charge transfer. As such, the multi-phase hybrid converter does not need high capacitance to achieve high efficiency operation, which can further increase solution density. Finally, by using an inventive gate driving technique, the multi-phase hybrid converter can operate at a higher duty cycle than other approaches.

The term "converter," as used in this disclosure, includes but is not limited to any one of, or any combination of "regulator," "DC regulator," "voltage regulator," "DC voltage regulator," "DC-DC converter," "DC converter" and "converter." and includes, but is not limited to, the plain meaning of any one or more of these terms.

Multi-phase hybrid converters can include both dual-phase hybrid converters as well as N-phase hybrid converters. Various examples of a dual-phase hybrid converter are described below with respect to FIGS. 1-12D and various examples of an N-phase hybrid converter are described below with respect to FIGS. 13-17.

Figure 1:
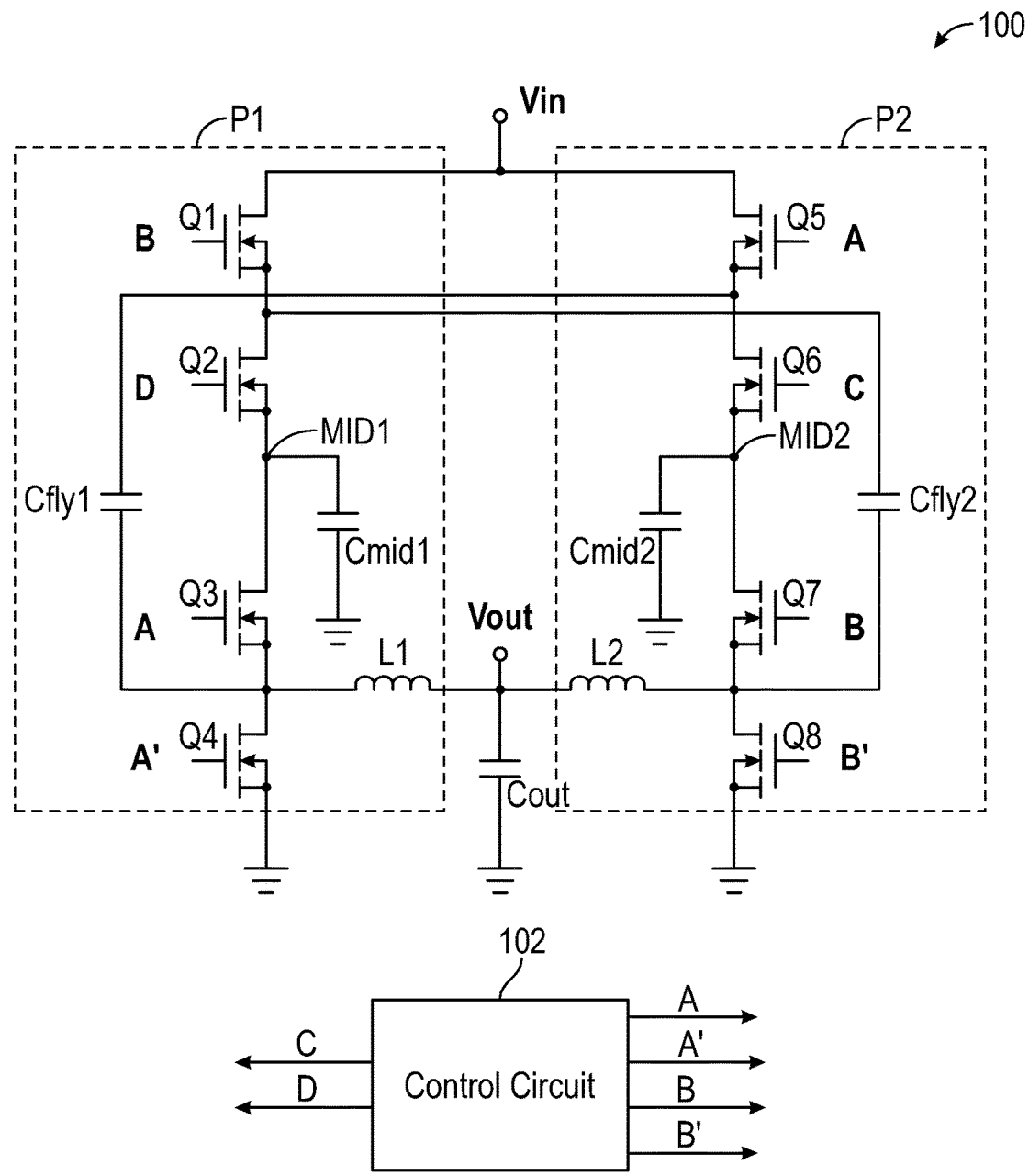
FIG. 1 is a schematic diagram of an example of a dual-phase hybrid converter.

FIG. 1 is a schematic diagram of an example of a dual-phase hybrid converter 100. The dual-phase hybrid converter 100 can include a first half power stage P1 including a first switching element $Q_1$, a second switching element $Q_2$, a third switching element $Q_3$, a fourth switching element $Q_4$, a first inductor $L_1$, and a first switched-capacitor $C_{fly1}$ (also referred to in this disclosure as a flying capacitor). The dual-phase hybrid converter 100 can further include a second half power stage P2 including a fifth switching element $Q_5$, a sixth switching element $Q_6$, a seventh switching element $Q_7$, an eighth switching element $Q_8$, a second inductor $L_2$, and a second switched-capacitor capacitor $C_{fly2}$ (also referred to in this disclosure as a flying capacitor). The switching elements of FIG. 1 can be transistors, e.g., power transistors.

In the example shown in FIG. 1, the first switching element $Q_1$ and the second switching element $Q_2$ are connected in series between the input voltage $V_{IN}$ and a first middle node MID1. The fifth switching element $Q_5$ and the sixth switching element $Q_6$ are connected in series between the input voltage $V_{IN}$ and a second middle node MID2.

The dual-phase hybrid converter 100 can provide regulation using at least one switched-capacitor circuit with at least one switching converter circuit, and thus is a hybrid converter. For example, the first half power stage P1 can include a first switched-converter circuit and a first switching converter circuit. The first switched-converter circuit can include the first switching element $Q_1$, the second switching element $Q_2$, and the first flying capacitor $C_{fly1}$, and a first switching converter circuit that includes the third switching element $Q_3$, the fourth switching element $Q_4$, and the first inductor $L_1$. As seen in FIG. 1, the second switching element $Q_2$ is coupled in series with the third switching element $Q_3$.

Similarly, the second half power stage P2 can include a second switched-converter circuit and a second switching converter circuit. The second switched-converter circuit can include the fifth switching element $Q_5$, the sixth switching element $Q_6$, and the second flying capacitor $C_{fly2}$, and a second switching converter circuit that includes the seventh switching element $Q_7$, the eighth switching element $Q_8$, and the second inductor $L_2$. The sixth switching element $Q_6$ is coupled in series with the seventh switching element $Q_7$.

As seen in FIG. 1, the flying capacitors $C_{fly1}$ and $C_{fly2}$ of the dual-phase hybrid converter 100 are cross-coupled. More particularly, the first flying capacitor ($C_{fly1}$) can be connected between the second switched-capacitor circuit and the first switching converter circuit, and the second flying capacitor $C_{fly2}$ can be connected between the first switched-capacitor circuit and the second switching converter circuit.

The dual-phase hybrid converter 100 can receive an input voltage $V_{IN}$ from an input terminal and provide an output voltage $V_O$ to an output terminal that is connected to an output capacitor $C_{OUT}$. In some examples, the output terminal of the dual-phase hybrid converter 100 can be coupled to any desired load. The dual-phase hybrid converter 100 can operate with a duty cycle "D" that changes in relation to a ratio of $2 V_O/V_{IN}$ (duty cycle=D=$2V_O/V_{IN}$).

A control circuit 102 can output control signals to the corresponding control nodes of the switching elements, such as to the gate terminals of transistors, of the dual-phase hybrid converter 100. The control circuit 102 can include logic circuitry to generate control signals A, A', B, B', C, and D. The controls signals can be square wave signals, for example. In some examples, the control circuit 102 can control the frequency and duty cycle of the control signals.

In some examples, the control circuit 102 can include a pulse-width modulation (PWM) controller that generates PWM signals to power stages P1, P2 to turn the switching elements $Q_1$-$Q_8$ ON or OFF according to a switching frequency and/or duty cycle. The control circuit 102 can include an input/output (I/O) interface and can be programmed (e.g., before start-up of the converter) with a switching frequency and/or duty cycle, for example, by way of the I/O interface.

As shown in FIG. 1, the first through eighth switching elements $Q_1$-$Q_8$ are controlled by control signals A, A', B, B', C and D, where A' is complementary control signal of A, and B' is complementary control signal of B. Because the example shown in FIG. 1 implements the switching element using n-type transistors (such as n-type field-effect transistors), when a given control signal is high, the corresponding switching element is ON. However, implementations using p-type transistors, n-type and p-type transistors, and/or other types of switches are also possible.

Figure 2:
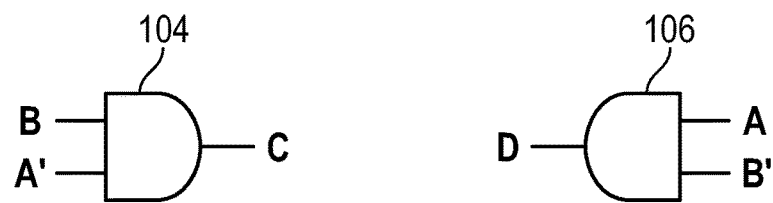
FIG. 2 is a schematic diagram of an example of control logic circuitry for the dual-phase hybrid converter of FIG. 1.

An example of logic circuitry to generate control signals C and D is shown and described with respect to FIG. 2. The control signal D can be generated using a first AND gate 104 by (B AND A'), and the control signal C can be generated using a second AND gate 106 by (A AND B').

As described in detail below, the control circuit 102 can control operation of the first switching converter circuit ($Q_3$, $Q_4$, $L_1$) using a first timing phase ($\phi$1) and control operation of the second switching converter circuit ($Q_7$, $Q_8$, $L_2$) using a second timing phase ($\phi$2). As such, the hybrid converter 100 of FIG. 1 is a "dual-phase" hybrid converter.

In some examples, the dual-phase hybrid converter circuit 100 can include a first capacitor $C_{mid1}$ coupled between a first node MID1 between the second switching element $Q_2$ and the third switching element $Q_3$ and a reference voltage node, such as a ground node. Similarly, the dual-phase hybrid converter circuit 100 can include a second capacitor $C_{mid2}$ coupled between a second node MID2 between the sixth switching element $Q_6$ and the seventh switching element $Q_7$ and the reference voltage node.

Including the first capacitor $C_{mid1}$ and the second capacitor $C_{mid2}$ can be advantageous. For example, the capacitors $C_{mid1}$, $C_{mid2}$ can reduce the parasitic inductance from a long hot loop in the design. Shortening the hot loop and reducing the parasitic inductance can also reduce ringing at high frequencies. In addition, the inclusion of the capacitors $C_{mid1}$, $C_{mid2}$ can ensure that the voltage stress of switching elements $Q_2$, $Q_3$, $Q_6$, and $Q_7$ is Vin/2.

As mentioned above, the flying capacitors $C_{fly1}$ and $C_{fly2}$ can be cross-coupled. By cross-coupling the flying capacitors, a voltage does not need to be shared between the two power stages P1, P2. That is, the first node MID1 between the second switching element $Q_2$ and the third switching element $Q_3$ and the second node MID2 between the sixth switching element $Q_6$ and the seventh switching element $Q_7$ do not need to be connected. By eliminating the connection, the efficiency of the dual-phase hybrid converter 100 can be increased because there is no DC current flowing back and forth between the two power stages P1, P2.

FIG. 2 is a schematic diagram of an example of control logic circuitry for the dual-phase hybrid converter of FIG. 1. As shown in the example of FIG. 2, control signal C can be generated using a first AND gate 104 by (A' AND B), and control signal D can be generated using a second AND gate 106 by (A AND B').

In this manner, the control logic circuitry of FIG. 2 can generate a third control signal (C) using one of the complementary first control signals (A') and one of the complementary second control signals (B). The control signal C can control operation of the second switched-capacitor circuit ($Q_5$, $Q_6$, $C_{fly1}$).

Similarly, the control logic circuitry of FIG. 2. can generate another third control signal (D) using the other of the complementary first control signals (A) and the other of the complementary second control signals (B'). The control signal D can control operation of the first switched-capacitor circuit ($Q_1$, $Q_2$, $C_{fly2}$).

In some examples, the first and second AND gates 104, 106 can form part of the control circuit 102 of FIG. 1.

Figure 3:
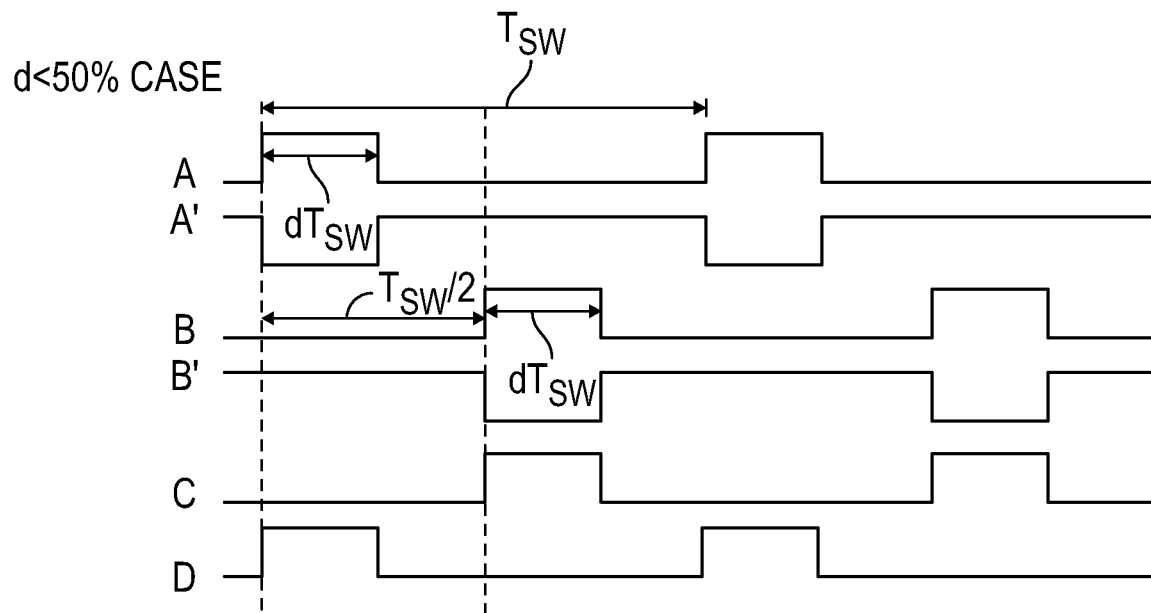
FIG. 3 is an example of a timing diagram of the control signals of the dual-phase hybrid converter in FIG. 1.

FIG. 3 is an example of a timing diagram of the control signals of the dual-phase hybrid converter in FIG. 1 where the duty cycle is less than 50%. The switching period is $T_{SW}$ and includes $D*T_{SW}$ ($\phi$2) and $(1-D*T_{SW})$ ($\phi$1), where D is the duty cycle and * represents the mathematical operate for multiplication. The time $(1-D*T_{SW})$ can represent a first timing phase $\phi$1 (shown as complementary control signals B, B') and the time $D*T_{SW}$ can represent a second timing phase $\phi$2 (shown as control signals complementary A, A'). As seen in the example of FIG. 3, the first timing phase $\phi$1 (specifically control signal B) and the second timing phase $\phi$2 (specifically control signal A) do not overlap with one another. A control circuit, such as the control circuit 102 of FIG. 1, can generate the first and second timing phases according to a switching cycle having a switching frequency and a duty cycle, where the duty cycle is less than 50%.

In some non-limiting examples, the control signals A and B can be 180 degrees out of phase, such as by setting the time between a rising edge of a logic high of the A control signal and a rising edge of a logic high of the B control signal at half the switching period, or $T_{SW}/2$.

Figure 4:
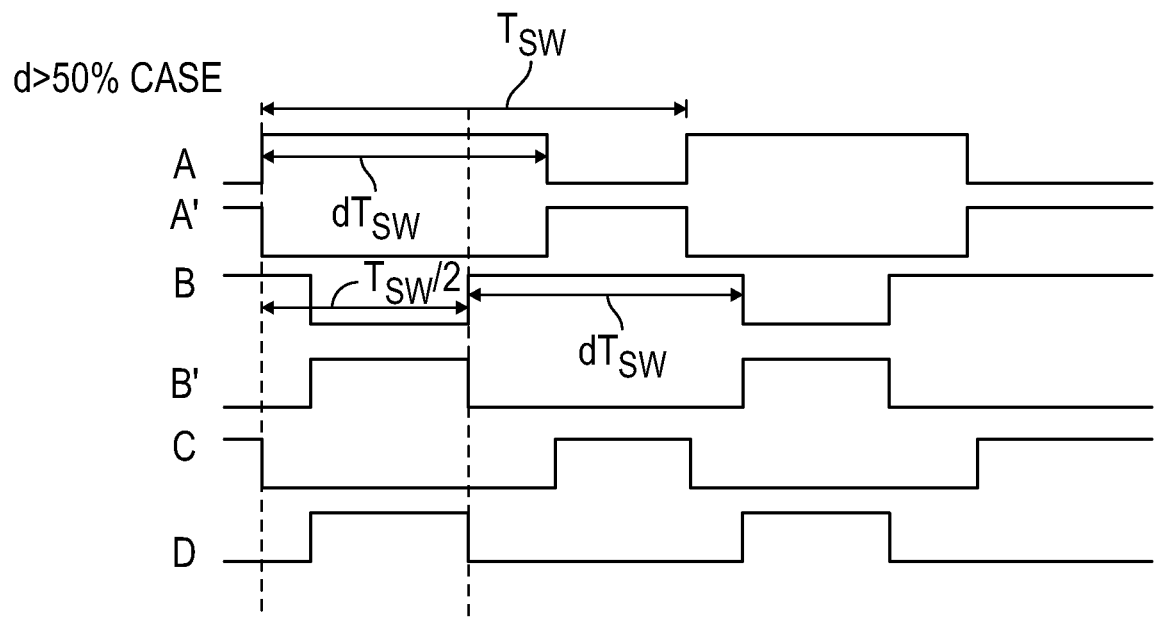
FIG. 4 is another example of a timing diagram of the control signals of the dual-phase hybrid converter in FIG. 1.

FIG. 4 is another example of a timing diagram of the control signals of the dual-phase hybrid converter in FIG. 1 where the duty cycle is greater than 50%. The switching period is $T_{SW}$ and includes $D*T_{SW}$ ($\phi$2) and $(1-D*T_{SW})$ ($\phi$1), where D is the duty cycle and * represents the mathematical operate for multiplication. The time $(1-D*T_{SW})$ can represent a first timing phase 1 (shown as complementary control signals B, B'), and the time $D*T_{SW}$ can represent a second timing phase φ2 (shown as complementary control signals A, A'). As seen in the example of FIG. 4, the first timing phase φ1 (specifically control signal B) and the second timing phase φ2 (specifically control signal A) can overlap with one another. A control circuit, such as the control circuit 102 of FIG. 1, can generate the first and second timing phases according to a switching cycle having a switching frequency and a duty cycle, where the duty cycle is greater than 50%.

The control circuit, such as the control circuit 102 of FIG. 1, can generate controls signals, such as shown in FIG. 3 or FIG. 4, and apply, according to a switching cycle having a switching frequency and a duty cycle, the complementary first control signals, the complementary second control signals, and the complementary third control signals, where the switching cycle includes the first timing phase (φ1) and the second timing phase (φ2). In response, the first switching converter circuit, the second switching converter circuit, the first switched-capacitor circuit, and the second switched-capacitor circuit can generate a series of pulses to at least one LC circuit including at least one capacitor, e.g., the output capacitor $C_{OUT}$ or the input capacitor $C_{IN}$ of FIG. 11, and at least one inductor, e.g., at least one of the inductors $L_1$, $L_2$.

The control circuit can then adjust the duty cycle of the switching signals, specifically control signals A and B, to adjust the series of pulses to set an output voltage across an output capacitor at a predefined and essentially constant amplitude. The dual-phase hybrid converter can then provide the output voltage across the output capacitor $C_{OUT}$ as an output voltage of the dual-phase hybrid converter. If the output capacitor $C_{OUT}$ is part of the LC circuit, such as in FIG. 1, then the configuration is a buck converter where the output voltage is less than the input voltage. If, however, the capacitor is not part of the LC circuit, such as the output capacitor $C_{OUT}$ in FIG. 11, then the configuration is a boost converter where the output voltage is greater than the input voltage.

In some non-limiting examples, the control signals A and B can be 180 degrees out of phase, such as by setting the time between a rising edge of a logic high of the A control signal and a rising edge of a logic high of the B control signal at half the switching period, or $T_{SW}/2$.

Figures 5A, 5B, 5C:
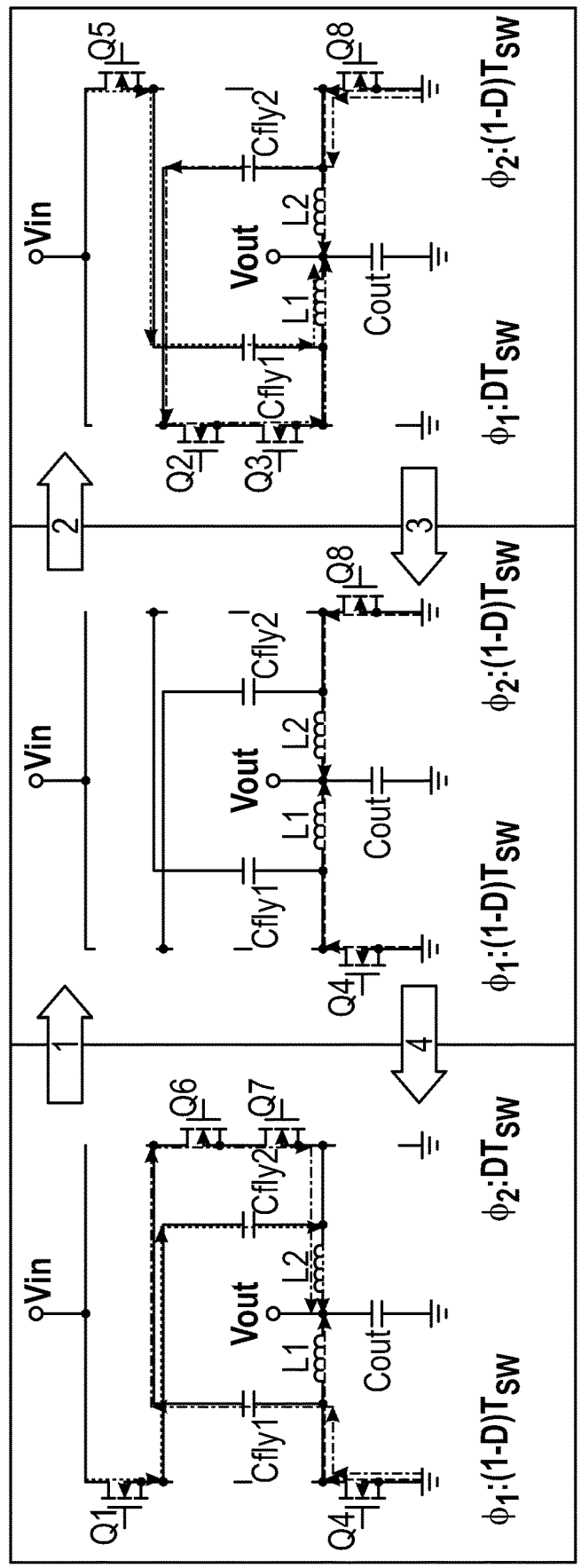
FIG. 5A is a schematic diagram of an example of a first operating phase of the dual-phase hybrid converter of FIG. 1 for a duty cycle less than 50%.
FIG. 5B is a schematic diagram of an example of a second operating phase of the dual-phase hybrid converter of FIG. 1 for a duty cycle less than 50%.
FIG. 5C is a schematic diagram of an example of a third operating phase of the dual-phase hybrid converter of FIG. 1 for a duty cycle less than 50%.

FIG. 5A is a schematic diagram of an example of a first operating phase of the dual-phase hybrid converter of FIG. 1 for a duty cycle less than 50%. The control circuit, such as the control circuit 102 of FIG. 1 can output various control signals to turn ON and OFF various switching elements of FIGS. 5A-5C. The switching elements $Q_1$, $Q_4$, $Q_6$, and $Q_7$ are turned ON and the switching elements $Q_2$, $Q_3$, $Q_5$, and $Q_8$ are turned OFF. The capacitor $C_{fly1}$ is coupled to ground and supplies half of the inductor current to the inductor $L_2$. The control circuit turns the switching element $Q_1$ ON and the input voltage VIN charges the capacitor $C_{fly2}$ and supplies the other half of the inductor current to the inductor $L_2$. The inductor $L_1$ is freewheeling. Additionally, the current through inductor $L_1$ ramps down while the current through inductor $L_2$ ramps up. The first timing phase φ1 is represented by $(1-D*T_{SW})$ and the second timing phase φ2 is represented by $D*T_{SW}$ in the first operating phase of FIG. 5A.

FIG. 5B is a schematic diagram of an example of a second operating phase of the dual-phase hybrid converter of FIG. 1 for a duty cycle less than 50%. The switching elements $Q_4$ and $Q_8$ are turned ON and the switching elements $Q_1$-$Q_3$ and $Q_5$-$Q_7$ are turned OFF. Both the inductor $L_1$ and the inductor $L_2$ are freewheeling. The first timing phase φ1 is represented by $(1-D*T_{SW})$ and the second timing phase φ2 is also represented by $(1-D*T_{SW})$ in the second operating phase of FIG. 5B.

FIG. 5C is a schematic diagram of an example of a third operating phase of the dual-phase hybrid converter of FIG. 1 for a duty cycle less than 50%. The switching elements $Q_2$, $Q_3$, $Q_5$, and $Q_8$ are turned ON and the switching elements $Q_1$, $Q_4$, $Q_6$, and $Q_7$ are turned OFF. The capacitor $C_{fly2}$ is coupled to ground and supplies half of the inductor current to the inductor $L_1$. The control circuit turns ON the switching element $Q_5$ and the input voltage VIN charges the capacitor $C_{fly1}$ and supplies the other half of the inductor current to the inductor $L_1$. The inductor $L_2$ is freewheeling. The first timing phase φ1 is represented by $D*T_{SW}$ and the second timing phase φ2 is represented by $(1-D*T_{SW})$ in the third operating phase of FIG. 5C.

Once the third operating phase is complete, the operation cycles back to the second operating phase of FIG. 5B and then to the first operating phase of FIG. 5A, where the operation begins again. During the operation, the switching element $Q_7$ follows the switching element $Q_1$, the switching element $Q_2$ follows the switching element $Q_8$, the switching element $Q_3$ follows the switching element $Q_5$, and the switching element $Q_6$ follows the switching element $Q_4$. Both flying capacitors are charged and discharged through an inductor.

FIGS. 12A-12D depict an alternative example operating phases of the dual-phase hybrid converter of FIG. 1 for a duty cycle less than 50%, as described in detail below.

FIG. 6A is a schematic diagram of an example of a first operating phase of the dual-phase hybrid converter of FIG. 1 for a duty cycle greater than 50%. The control circuit, such as the control circuit 102 of FIG. 1 can output various control signals to turn ON and OFF various switching elements of FIGS. 6A-6C. The switching elements $Q_1$, $Q_4$, $Q_6$, and $Q_7$ are turned ON and the switching elements $Q_2$, $Q_3$, $Q_5$, and $Q_8$ are turned OFF The operation in FIG. 6A is similar to the operation in FIG. 5A. The capacitor $C_{fly1}$ is coupled to ground and supplies half of the inductor current to the inductor $L_2$. The control circuit turns ON the switching element $Q_1$ and the input voltage VIN charges the capacitor $C_{fly2}$ and supplies the other half of the inductor current to the inductor $L_2$. The inductor $L_1$ is freewheeling. The first timing phase φ1 is represented by $(1-D*T_{SW})$ and the second timing phase φ2 is represented by $D*T_{SW}$ in the first operating phase of FIG. 6A.

FIG. 6B is a schematic diagram of an example of a second operating phase of the dual-phase hybrid converter of FIG. 1 for a duty cycle greater than 50%. The control circuit, e,g., the control circuit 102 of FIG. 1, can turn the switching elements $Q_1$, $Q_5$ ON at the same time. To prevent any cross-conduction, the control circuit can turn OFF the switching elements $Q_2$, $Q_6$. In some examples, the switching elements $Q_3$, $Q_7$ can be ON, such as shown in FIG. 6B. In other examples, the switching elements $Q_3$, $Q_7$ can be OFF.

When the switching element $Q_1$ turns ON, the inductor $L_2$ is charged through the capacitor $C_{fly2}$. Similarly, when the switching element $Q_5$ turns ON, the inductor $L_1$ is charged through the capacitor $C_{fly1}$. The first timing phase φ1 is represented by $D*T_{SW}$ and the second timing phase φ2 is also represented by $(D*T_{SW})$ in the second operating phase of FIG. 6B. As such, the first timing phase φ1 and the second timing phase overlap.

FIG. 6C is a schematic diagram of an example of a third operating phase of the dual-phase hybrid converter of FIG. 1 for a duty cycle greater than 50%. The switching elements $Q_2$, $Q_3$, $Q_5$, and $Q_8$ are ON and the switching elements $Q_1$, $Q_4$, $Q_6$, and $Q_7$ are OFF. The operation in FIG. 6C is similar to the operation in FIG. 5C. The capacitor $C_{fly2}$ is coupled to ground and supplies half of the inductor current to the inductor $L_1$. The control circuit turns ON the switching element $Q_5$ and the input voltage VIN charges the capacitor $C_{fly1}$ and supplies the other half of the inductor current to the inductor $L_1$. The inductor $L_2$ is freewheeling. The first timing phase φ1 is represented by $D*T_{SW}$ and the second timing phase φ2 is represented by $(1-D*T_{SW})$ in the third operating phase of FIG. 6C.

Once the third operating phase is complete, the operation cycles back to the second operating phase of FIG. 6B and then to the first operating phase of FIG. 6A, where the operation begins again. During the operation, the switching element $Q_6$ follows the switching elements $Q_1$, $Q_4$, and the switching element $Q_2$ follows the switching elements $Q_5$, $Q_8$. This operation can widen the input voltage range, which can allow for more greater fluctuations of the input voltage.

Figure 7:
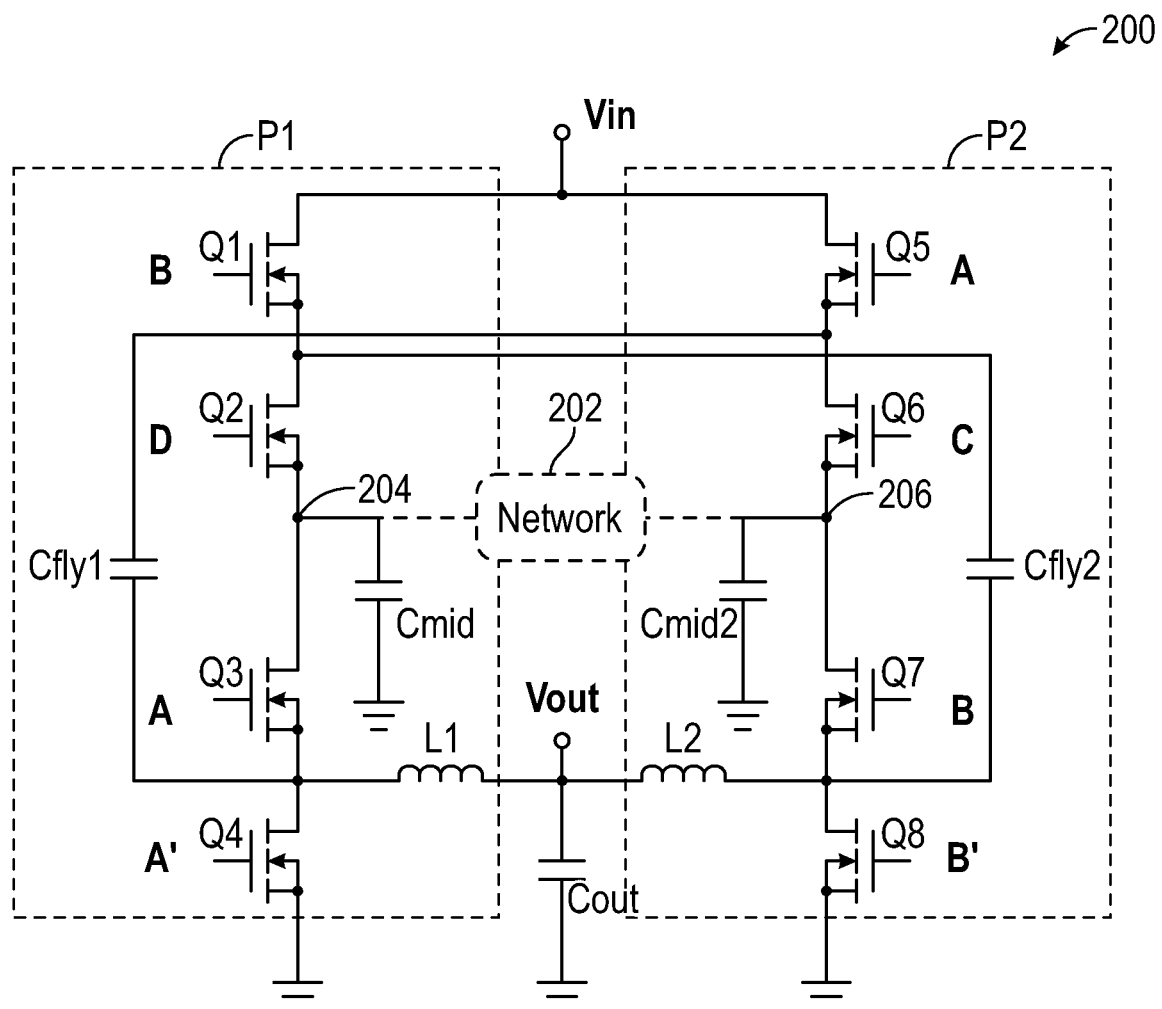
FIG. 7 is a schematic diagram of another example of a dual-phase hybrid converter.

FIG. 7 is a schematic diagram of another example of a dual-phase hybrid converter. In some examples, the dual-phase hybrid converter 200 can include a network circuit 202 coupled between a midpoint node 204 of the first half power stage P1 and a midpoint node 206 of the second half power stage P2. The midpoint node 204 is between the second switching element $Q_2$ and the third switching element $Q_3$ and the midpoint node 206 is between the sixth switching element $Q_6$ and the seventh switching element $Q_7$.

The network circuit 202 can include at least one of an electrical short (e.g., a. low impedance element that directly connects the two nodes), a resistive element, a capacitive element, or an inductive element. For example, the network circuit 202 can include a resistor, a capacitor, or an inductor. As another example, the network circuit 202 can include a resistor and a capacitor, a resistor and an inductor, or a capacitor and an inductor. As another example, the network circuit 202 can include a resistor, a capacitor, and an inductor.

Including a network circuit can be advantageous if during a transient there is a mismatch between the two flying capacitors. In addition, if there is a difference in voltage between the two flying capacitors, the network circuit can match it.

Figure 8:
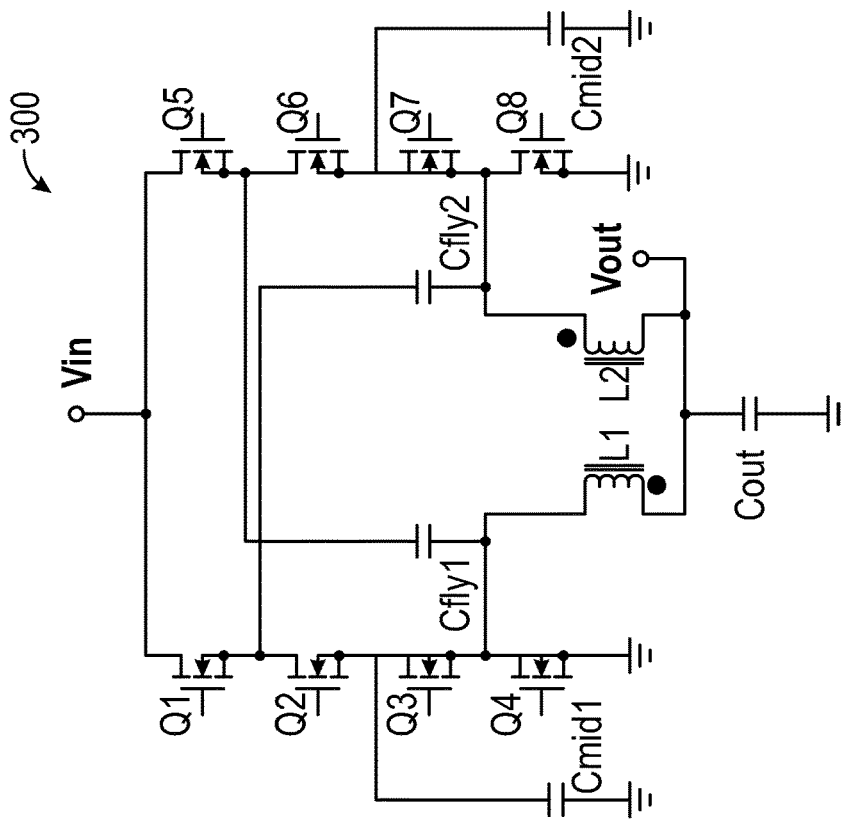
FIG. 8 is a schematic diagram of another example of a dual-phase hybrid converter.

FIG. 8 is a schematic diagram of another example of a dual-phase hybrid converter. The inductors $L_1$ and $L_2$ of the dual-phase hybrid converter 300 of FIG. 8 can be a coupled inductor, in contrast to being separate inductors like in FIG. 1. Using a coupled inductor can result in a smaller size and higher efficiency.

Figure 9:
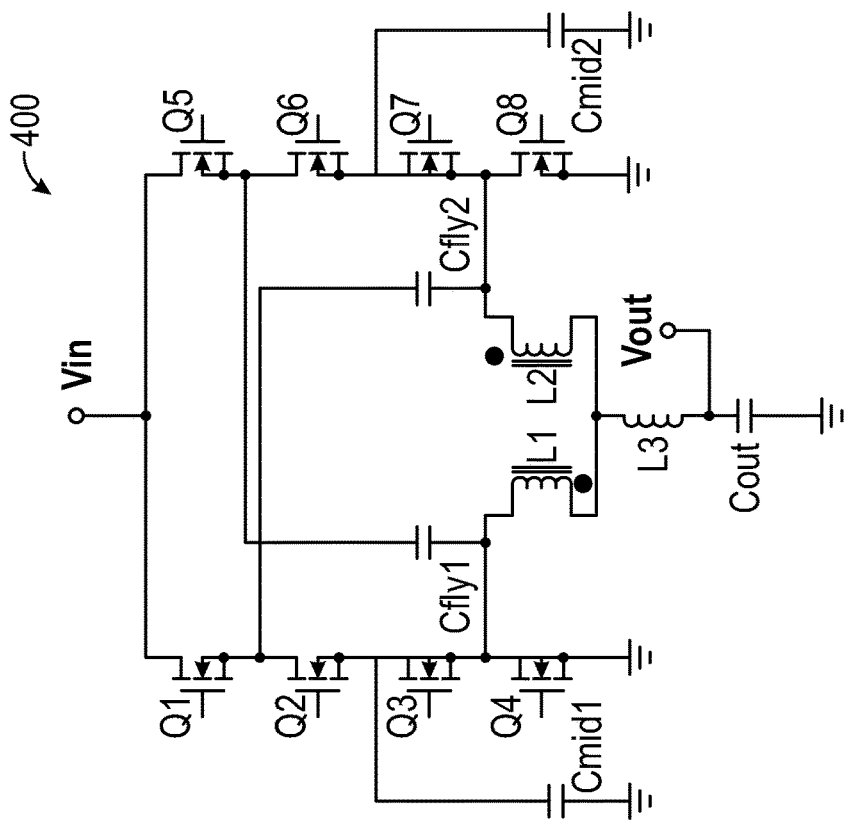
FIG. 9 is a schematic diagram of another example of a dual-phase hybrid converter.

FIG. 9 is a schematic diagram of another example of a dual-phase hybrid converter. The inductors $L_1$ and $L_2$ of the dual-phase hybrid converter 300 of FIG. 8 can be a transformer, in contrast to being separate inductors like in FIG. 1. In addition, the dual-phase hybrid converter 300 can include a small inductor L3 coupled between the transformer formed by $L_1$ and $L_2$ and the output capacitor $C_{OUT}$. Using a transformer can result in a smaller size and higher efficiency.

Figure 10:
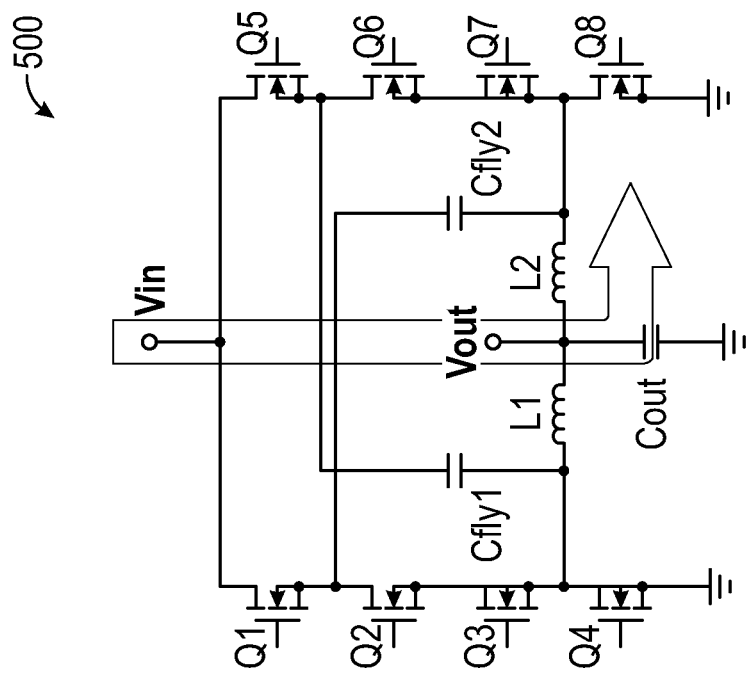
FIG. 10 is a schematic diagram of the dual-phase hybrid converter of FIG. 1 coupled as a buck converter.

FIG. 10 is a schematic diagram of the dual-phase hybrid converter of FIG. 1 coupled as a buck converter. The dual-phase hybrid converter 500 of FIG. 10 can receive an input voltage $V_{IN}$ at a node between the first switching element $Q_1$ and the fifth switching element $Q_5$ and generate an output voltage $V_{OUT}$ that is less than an input voltage at a node between the first inductor $L_1$ and the second inductor $L_2$.

Figure 11:
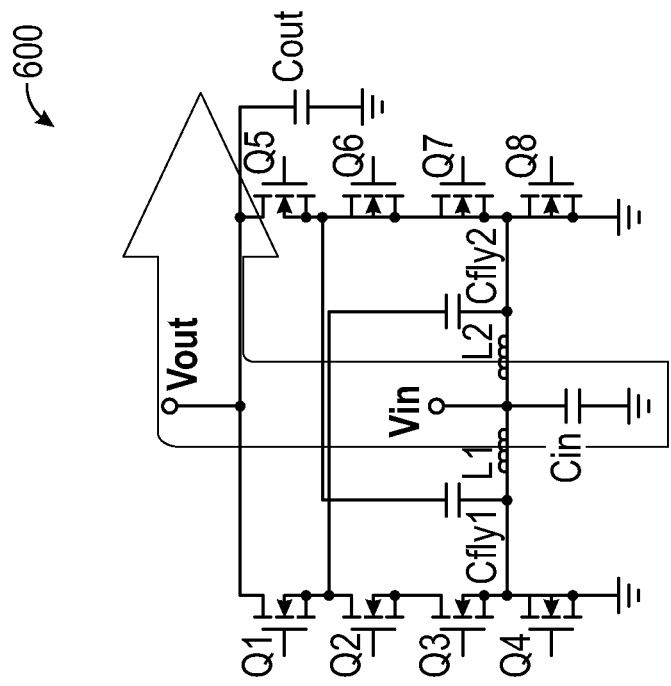
FIG. 11 is a schematic diagram of the dual-phase hybrid converter of FIG. 1 coupled as a boost converter.

FIG. 11 is a schematic diagram of the dual-phase hybrid converter of FIG. 1 coupled as a boost converter. The dual-phase hybrid converter 600 of FIG. 10 can receive an input voltage $V_{IN}$ at a node between the first inductor $L_1$ and the second inductor L2 and generate an output voltage $V_{OUT}$ that is greater than an input voltage at a node between the first switching element $Q_1$ and the fifth switching element $Q_5$.

FIG. 12A is a schematic diagram of another example of a first operating phase of the dual-phase hybrid converter of FIG. 1 for a duty cycle less than 50%. The control circuit, such as the control circuit 102 of FIG. 1 can output various control signals to turn ON and OFF various switching elements of FIGS. 5A-5C. The switching elements $Q_1$, $Q_4$, $Q_6$, and $Q_7$ are turned ON and the switching elements $Q_2$, $Q_3$, $Q_5$, and $Q_8$ are turned OFF. The capacitor $C_{fly1}$ is coupled to ground and supplies half of the inductor current to the inductor $L_2$. The control circuit turns the switching element $Q_1$ ON and the input voltage VIN charges the capacitor $C_{fly2}$ and supplies the other half of the inductor current to the inductor $L_2$. The inductor $L_1$ is freewheeling. Additionally, the current through inductor $L_1$ ramps down while the current through inductor $L_2$ ramps up. The first timing phase φ1 is represented by $(1-D*T_{SW})$ and the second timing phase φ2 is represented by $D*T_{SW}$ in the first operating phase of FIG. 12A.

FIG. 12B is a schematic diagram of an example of a second operating phase of the dual-phase hybrid converter of FIG. 1 for a duty cycle less than 50%. The switching elements $Q_4$ and $Q_8$ are turned ON and the switching elements $Q_1$-$Q_3$ and $Q_5$ and $Q_7$ are turned OFF. The switching element $Q_6$ is turned ON and can remain ON until the switching element $Q_5$ turns on in the third operating phase of FIG. 12C. Turning the switching element $Q_6$ ON can improve the voltage balancing between the capacitor $C_{fly1}$ and the capacitors $C_{mid1}$, $C_{mid2}$, especially for low duty cycles. Both the inductor $L_1$ and the inductor $L_2$ are freewheeling. The first timing phase φ1 is represented by $(1-D*T_{SW})$ and the second timing phase φ2 is also represented by $(1-D*T_{SW})$ in the second operating phase of FIG. 12B.

FIG. 12C is a schematic diagram of another example of a third operating phase of the dual-phase hybrid converter of FIG. 1 for a duty cycle less than 50%. The switching elements $Q_2$, $Q_3$, $Q_5$, and $Q_8$ are turned ON and the switching elements $Q_1$, $Q_4$, $Q_6$, and $Q_7$ are turned OFF. The capacitor $C_{fly2}$ is coupled to ground and supplies half of the inductor current to the inductor $L_1$. The control circuit turns ON the switching element $Q_5$ and the input voltage VIN charges the capacitor $C_{fly1}$ and supplies the other half of the inductor current to the inductor $L_1$. The inductor $L_2$ is freewheeling. The first timing phase φ1 is represented by $D*T_{SW}$ and the second timing phase φ2 is represented by $(1-D*T_{SW})$ in the third operating phase of FIG. 12C.

FIG. 12D is a schematic diagram of an example of a fourth operating phase of the dual-phase hybrid converter of FIG. 1 for a duty cycle less than 50%. The switching elements $Q_4$ and $Q_8$ are turned ON and the switching elements $Q_1$-$Q_3$ and $Q_5$ and $Q_7$ are turned OFF. The switching element $Q_2$ is turned ON and can remain ON until the switching element $Q_1$ turns on in the first operating phase of FIG. 12A. Turning the switching element $Q_2$ ON can improve the voltage balancing between the capacitor $C_{fly2}$ and the capacitors $C_{mid1}$, $C_{mid2}$, especially for low duty cycles. Both the inductor $L_1$ and the inductor $L_2$ are freewheeling. The first timing phase φ1 is represented by $(1-D*T_{SW})$ and the second timing phase φ2 is also represented by $(1-D*T_{SW})$ in the second operating phase of FIG. 12B.

Once the fourth operating phase is complete, the operation cycles back to the first operating phase of FIG. 12A, where the operation begins again. During the operation, the switching element $Q_7$ follows the switching element $Q_1$, the switching element $Q_2$ follows the switching element $Q_8$, the switching element $Q_3$ follows the switching element $Q_5$, and the switching element $Q_6$ follows the switching element $Q_4$. Both flying capacitors are charged and discharged through an inductor.

The techniques of this disclosure are not limited to a dual-phase hybrid converter. Rather, the techniques can be extended to an N-phase hybrid converter, where N is greater than 2. The present inventors have recognized that it can be desirable to add two or more phases in parallel to reduce thermal stress and reduce input and output ripples.

The present inventors have recognized that it can be desirable, in some implementations, to be able to add one phase at a time to increase power output, in contrast to some approaches that require the addition of two or more phases. Similarly, the present inventors have recognized that it can be desirable to shed one phase at a time, such as during lighter load conditions, in order to improve efficiency. In other words, operation of one (or more phases) can be disabled during a time period in which operation would otherwise be enabled.

The N-phase hybrid converter can include multiple inductors that can be discrete or coupled on shared magnetic cores ("coupled inductors").

Figure 13:
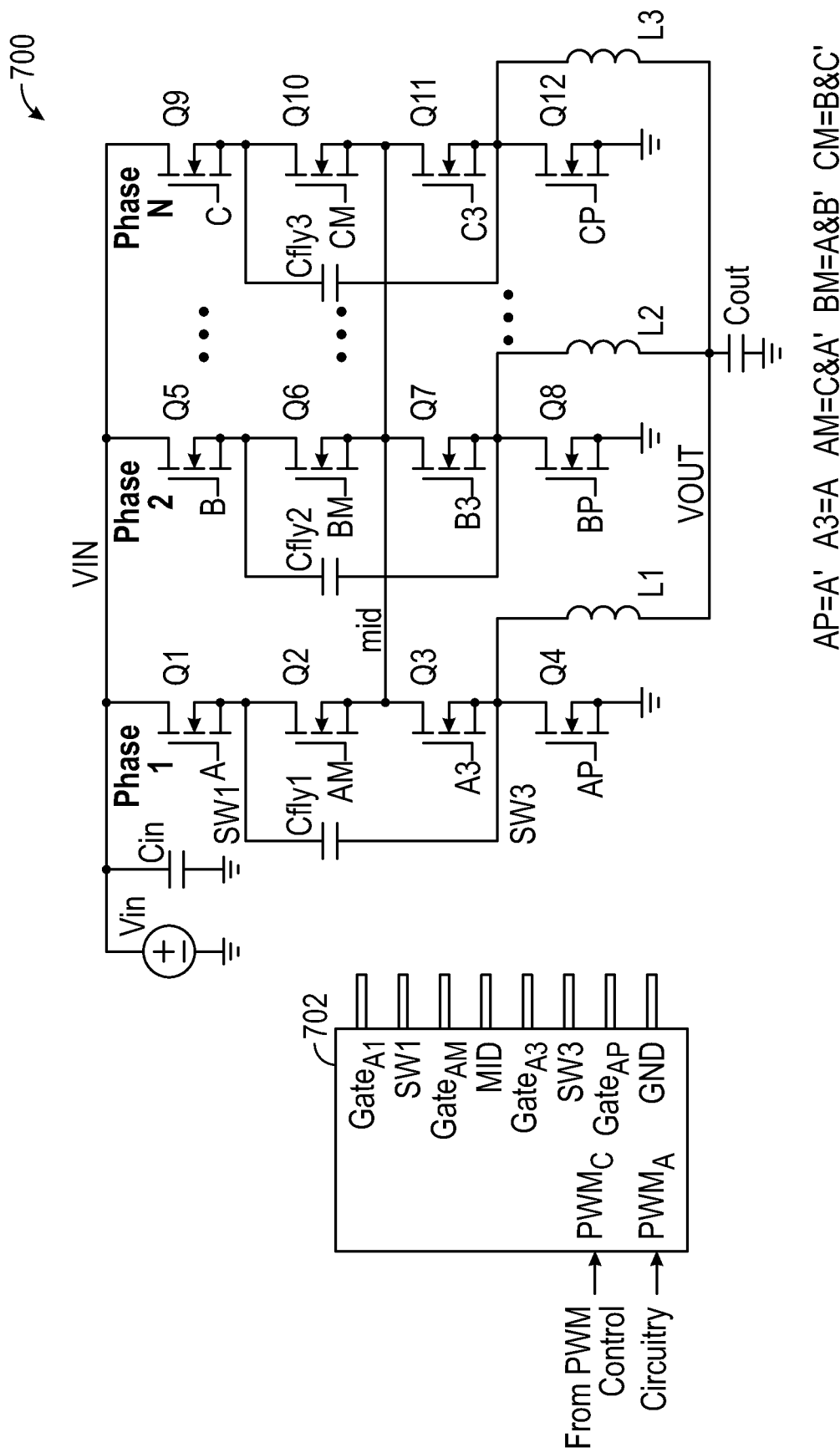
FIG. 13 is a schematic diagram of an example of an N-phase hybrid converter.

FIG. 13 is a schematic diagram of an example of an N-phase hybrid converter 700. The N-phase hybrid converter 700 can include first phase circuitry, second phase circuitry, third phase circuitry, and so forth up to N phase circuitry.

The first phase circuitry can include a first switching element $Q_1$, a second switching element $Q_2$, a third switching element $Q_3$, a fourth switching element $Q_4$, a first inductor $L_1$, and a first switched-capacitor $C_{fly1}$ (also referred to in this disclosure as a flying capacitor). The switching elements of FIG. 13 can be transistors, e.g., power transistors.

The second phase circuit can include a fifth switching element $Q_5$, a sixth switching element $Q_6$, a seventh switching element $Q_7$, an eighth switching element $Q_8$, a second inductor $L_2$, and a second switched-capacitor capacitor $C_{fly2}$ (also referred to in this disclosure as a flying capacitor).

The N phase circuit can include a ninth switching element $Q_9$, a tenth switching element $Q_{10}$, an eleventh switching element $Q_{11}$, a twelfth switching element $Q_{13}$, a third inductor $L_3$, and a third switched-capacitor capacitor $C_{fly3}$ (also referred to in this disclosure as a flying capacitor). Additional phase circuitry, such as third, fourth, fifth, etc. phase circuitry, can be included between the second phase circuitry and the N phase circuitry.

In the example shown in FIG. 13, the first switching element $Q_1$ and the second switching element $Q_2$ are connected in series between the input voltage $V_{IN}$ and a middle node MID. The fifth switching element $Q_5$ and the sixth switching element $Q_6$ as well as the ninth switching element $Q_9$ and the tenth switching element $Q_{10}$ are similarly connected.

The N-phase hybrid converter 700 can provide regulation using at least one switched-capacitor circuit with at least one switching converter circuit, and thus is a hybrid converter. For example, the first phase circuitry can include a first switched-converter circuit and a first switching converter circuit. The first switched-converter circuit can include the first switching element $Q_1$, the second switching element $Q_2$, and the first flying capacitor $C_{fly1}$, and a first switching converter circuit that includes the third switching element $Q_3$, the fourth switching element $Q_4$, and the first inductor $L_1$. As seen in FIG. 1, the second switching element $Q_2$ is coupled in series with the third switching element $Q_3$.

Similarly, the second phase circuitry can include a second switched-converter circuit and a second switching converter circuit. The second switched-converter circuit can include the fifth switching element $Q_5$, the sixth switching element $Q_6$, and the second flying capacitor $C_{fly2}$, and a second switching converter circuit that includes the seventh switching element $Q_7$, the eighth switching element $Q_8$, and the second inductor $L_2$. The sixth switching element $Q_6$ is coupled in series with the seventh switching element $Q_7$.

Similarly, the N phase circuitry can include a third switched-converter circuit and a third switching converter circuit. The third switched-converter circuit can include the ninth switching element $Q_9$, the tenth switching element $Q_{10}$, and the third flying capacitor $C_{fly3}$, and a third switching converter circuit that includes the eleventh switching element $Q_{11}$, the twelfth switching element $Q_{12}$, and the third inductor $L_2$. The tenth switching element $Q_{10}$ is coupled in series with the eleventh switching element $Q_{11}$. Although only three switched-converter circuits and three switching converter circuits are shown, the techniques can be extended to N phases.

The N-phase hybrid converter 700 can receive an input voltage $V_{IN}$ from an input terminal and provide an output voltage $V_O$ to an output terminal that is connected to an output capacitor $C_{OUT}$. In some examples, the output terminal of the N-phase hybrid converter 700 can be coupled to any desired load. The N-phase hybrid converter 700 can operate with a duty cycle "D" that changes in relation to a ratio of $2V_O/V_{IN}$ (duty cycle=D=$2V_O/V_{IN}$).

A control circuit 702 can output control signals to the corresponding control nodes of the switching elements, such as to the gate terminals of transistors, of the dual-phase hybrid converter 700. The control circuit 702 can receive PWM signals from PWM control circuitry, for example. For example, the PWM control circuitry can include a pulse-width modulation (PWM) control circuit, such as the PWM control circuit 902 of FIG. 17, that generates PWM signals to turn the switching elements $Q_1$-$Q_{12}$ ON or OFF according to a switching frequency and/or duty cycle. The control circuit 702 or other control circuitry can include an input/output (I/O) interface and can be programmed (e.g., before start-up of the converter) with a switching frequency and/or duty cycle, for example, by way of the I/O interface.

The control circuit 702 can receive voltages at nodes SW1, MID and GND and can include logic circuitry to generate phase one (first timing phase φ1) gate driver control signals A, AM, A3, and AP that can be applied to the gates of switching elements Q1-Q4. In other words, the control circuit 702 can be or can include a gate driver circuit common to the first switching element, the second switching element, the third switching element, and the fourth switching element.

The control circuit 702, or one or more additional control circuits, can include logic circuitry to generate phase two (second timing phase φ2) control signals B, BM, B3, BP, and phase N control signals C, CM, C3, and CP (Nth timing phase φN) for example. The controls signals can be square wave signals, for example. In some examples, the control circuit 702 can control the frequency and duty cycle of the control signals.

As shown in FIG. 13. the first through twelfth switching elements $Q_1$-$Q_{12}$ are controlled by various control signals, where AP=A', A3=A, AM=C&A', BP=B', B3=B, BM=A&B', CP=C', C3=C, and CM=B&C', where A' is complementary control signal of A, B' is complementary control signal of B, and C' is complementary control signal of C. Because the example shown in FIG. 13 implements the switching element using n-type transistors (such as n-type field-effect transistors), when a given control signal is high, the corresponding switching element is ON. However, implementations using p-type transistors, n-type and p-type transistors, and/or other types of switches are also possible.

As described in detail below, the control circuit 702 can control operation of the first switching converter circuit ($Q_3$, $Q_4$, $L_1$) using a first timing phase ($\phi1$), can control operation of the second switching converter circuit ($Q_7$, $Q_8$, $L_2$) using a second timing phase ($\phi2$), and can control operation of the Nth switching converter circuit ($Q_{11}$, $Q_{12}$, $L_3$) using an Nth timing phase ($\phi N$). As such, the hybrid converter 700 of FIG. 13 is an "N-phase" hybrid converter.

The inductors $L_1$, $L_2$, and $L_3$ of the N-phase hybrid converter 700 of FIG. 13 can be a coupled inductor that share a magnetic core, or they can be separate inductors. Using a coupled inductor can result in a smaller size and higher efficiency.

Figure 14:
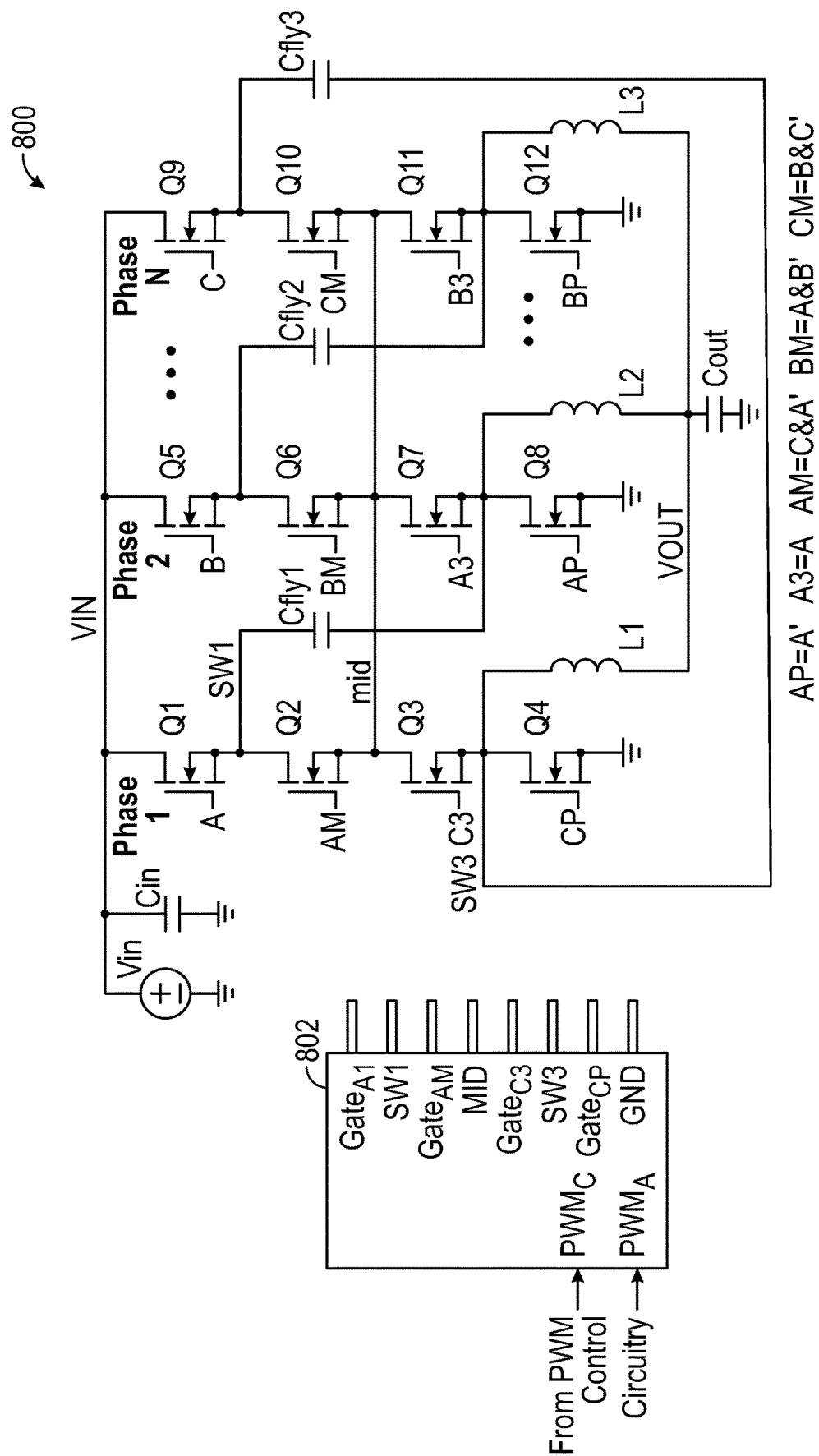
FIG. 14 is a schematic diagram of another example of an N-phase hybrid converter.

FIG. 14 is a schematic diagram of another example of an N-phase hybrid converter 800. The N-phase hybrid converter 800 can include first phase circuitry, second phase circuitry, third phase circuitry, and so forth up to N phase circuitry. Many of the features of FIG. 14 are similar to the features of FIG. 13 and, for purposes of conciseness, will not be described in detail again.

In contrast to the N-phase hybrid converter 700 of FIG. 13, the flying capacitors $C_{fly1}$ and $C_{fly2}$ can be cross-coupled in FIG. 14. For example, the first capacitor $C_{fly1}$ can be cross-coupled between the first switched-capacitor circuit ($Q_1$, $Q_2$, $C_{fly1}$) and the second switching converter circuit ($Q_7$, $Q_8$, $L_2$). Similarly, the second capacitor $C_{fly1}$ can be cross-coupled between the second switched-capacitor circuit ($Q_5$, $Q_6$, $C_{fly2}$) and a third switching converter circuit ($Q_{11}$, $Q_{12}$, $L_3$), and so forth for all N phases. The flying capacitor of the last phase can then be coupled to the first switching converter circuit ($Q_3$, $Q_4$, $L_1$). By cross-coupling the flying capacitors, a voltage does not need to be shared between adjacent circuitry.

The inductors $L_1$, $L_2$, and $L_3$ of the N-phase hybrid converter 800 of FIG. 14 can be a coupled inductor that share a magnetic core, or they can be separate inductors. Using a coupled inductor can result in a smaller size and higher efficiency.

It can be desirable, in sonic implementations, to add one phase at a time to increase power output. For example, assume that the N-phase hybrid converter 800 of FIG. 14 (or the N-phase hybrid converter 700 of FIG. 13) is operating in a dual-phase mode where the switching elements Q1-Q8 are configured to turn ON and OFF and the switching elements Q9-12 are OFF. Using various techniques of this disclosure, if the load increases, the N-phase hybrid converter 800 can add another phase by turning the switching elements Q9-12 ON and OFF. This is in contrast to other approaches where phases must be added in groups of two to support additional loading, which can be inefficient.

Similarly, it can be desirable to shed one phase at a time, such as during lighter load conditions, in order to improve efficiency. For example, if the load, decreases, the N-phase hybrid converter 800 (or the N-phase hybrid converter 700 of FIG. 13) can turn the switching elements Q9-12 OFF while continuing to turn ON and OFF the switching elements Q1-Q8, thereby decreasing the power output of the N-phase hybrid converter 700. In other words, operation of one or more phases can be disabled during a time period in which operation would otherwise be enabled.

Figure 15:
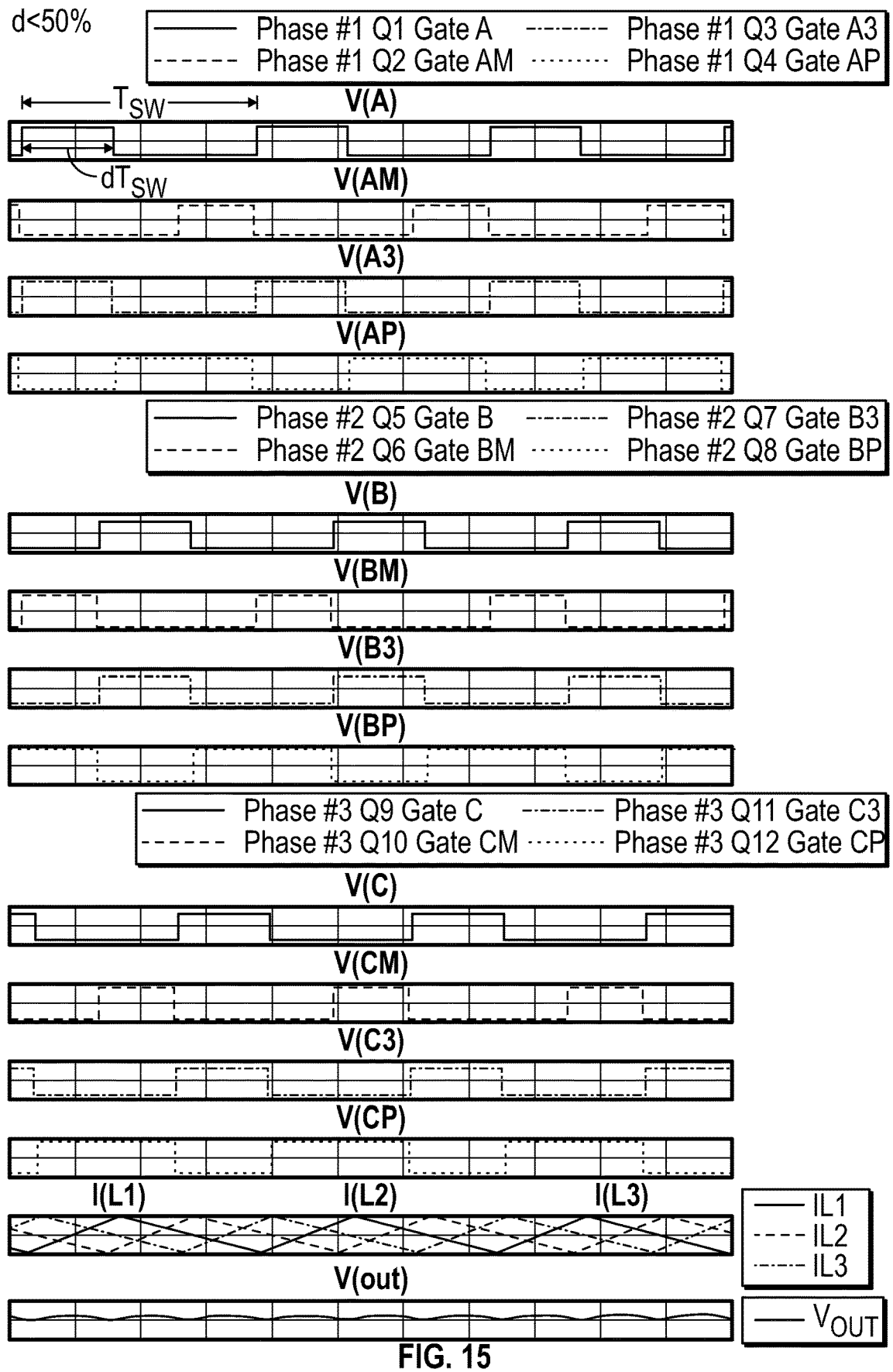
FIG. 15 is an example of a timing diagram of the control signals of the N-phase hybrid converters of FIG. 13 where the duty cycle is less than 50%.

FIG. 15 is an example of a timing diagram of the control signals of the N-phase hybrid converters of FIG. 13 where the duty cycle is less than 50%. Graphs 1-4 represent the control signals A, AM, A3, and AP for the first timing phase. Graphs 5-8 represent the control signals B, BM, B3, and BP for the second timing phase. Graphs 9-12 represent the control signals C, CM, C3, and CP for the third timing phase. Graph 13 represents the current through inductors L1, L2, and L3. The bottom graph, graph 14, represents the output voltage VOUT.

Referring to graphs 1-4, signal V(ap) is a complementary control signal of signal V(a), V(a3)=V(a), and V(am)=V(c) &V(ap). The signal V(a) is applied during the first phase to the gate of Q1. The signal V(am) is applied during the first phase to the gate of Q2. The signal V(a3) is applied during the first phase to the gate of Q3. The signal V(ap) applied during the first phase to the gate of Q4. The switching period is $T_{SW}$.

Referring to graphs 5-8, signal V(bp) is a complementary control signal of signal V(b), V(b3)=V(b), and V(bm)=V(a) &V/(bp). The signal V(b) is applied during the second phase to the gate of Q5. The signal V(bm) is applied during the second phase to the gate of Q6. The signal V(b3) is applied during the second phase to the gate of Q7. The signal V(bp) is applied during the second phase to the gate of Q8.

Referring to graphs 9-12, signal V(cp) is a complementary control signal of signal V(c), V(c3)=V(c), and V(cm)=V(b) &N(cp). The signal V(c) is applied during the third phase to the gate of Q9. The signal V(cm) is applied during the third phase to the gate of Q10. The signal V(c3) is applied during the third phase to the gate of Q11. The signal V(cp) is applied during the third phase to the gate of Q12.

A control circuit, such as the control circuit 802 of FIG. 13, can generate the first, second, third, etc. timing phases according to a switching cycle having a switching frequency and a duty cycle, where the duty cycle is less than 50%.

Figure 16:
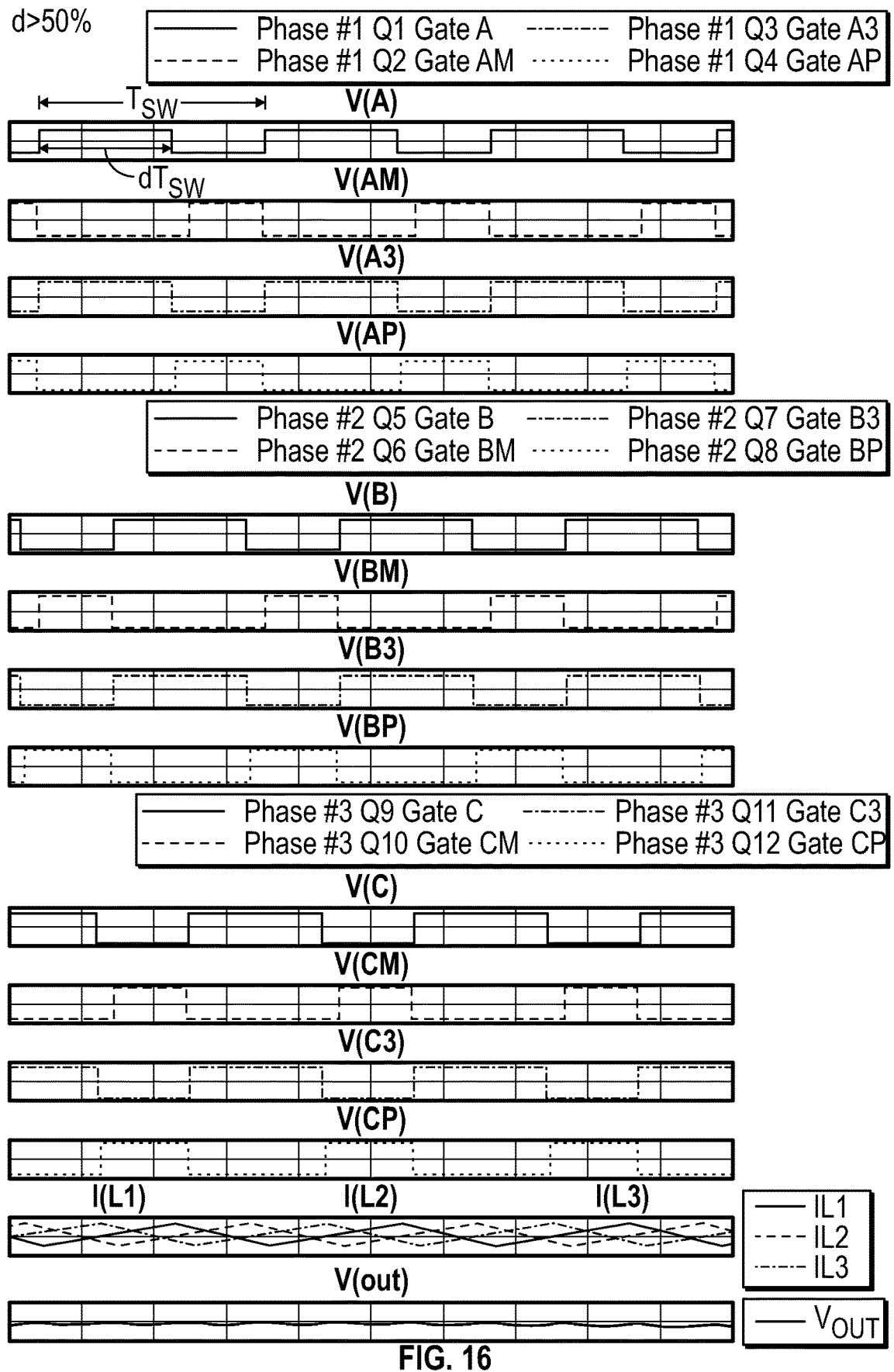
FIG. 16 is another example of a timing diagram of the control signals of the N-phase hybrid converter of FIG. 13 where the duty cycle is greater than 50%.

FIG. 16 is another example of a timing diagram of the control signals of the N-phase hybrid converter of FIG. 13 where the duty cycle is greater than 50%. Graphs 1-4 represent the control signals A, AM, A3, and AP for the first timing phase. Graphs 5-8 represent the control signals B, BM, B3, and BP for the second timing phase. Graphs 9-12 represent the control signals C, CM, C3, and CP for the third timing phase. Graph 13 represents the current through inductors L1, L2, and L3. The bottom graph, graph 14, represents the output voltage VOUT. The signals in FIG. 16 are similar to the signals in FIG. 15 and, for purposes of conciseness, will not be described in detail again.

The control circuit, such as the control circuit 702 of FIG. 13, can generate controls signals A, B, C (and other controls signals derived from signals A, B, and C), such as shown in FIG. 15 or FIG. 16, and apply, according to a switching cycle having a switching frequency and a duty cycle, the complementary first control signals, the complementary second control signals, and the complementary third control signals, where the switching cycle includes a first timing phase ($\phi1$), a second timing phase ($\phi2$), and a third timing phase ($\phi3$). In response, the switching converter circuits and the switched-capacitor circuits can generate a series of pulses to at least one LC circuit including at least one capacitor, e.g., the output capacitor $C_{OUT}$ or the input capacitor $C_{IN}$ of FIGS. 13 and 14, and at least one inductor, e.g., at least one of the inductors $L_1$, $L_2$, $L_3$.

The control circuit can then adjust the duty cycle of the switching signals, such as control signals A, B, and C, to adjust the series of pulses to set an output voltage across an output capacitor at a predefined and essentially constant amplitude. The N-phase hybrid converter can then provide the output voltage across the output capacitor $C_{OUT}$ as an output voltage of the N-phase hybrid converter. If the output capacitor $C_{OUT}$ is part of the LC circuit, such as in FIGS. 13 and 14, then the configuration is a buck converter where the output voltage is less than the input voltage. If, however, the capacitor is not part of the LC circuit, then the configuration is a boost converter where the output voltage is greater than the input voltage.

Figure 17:
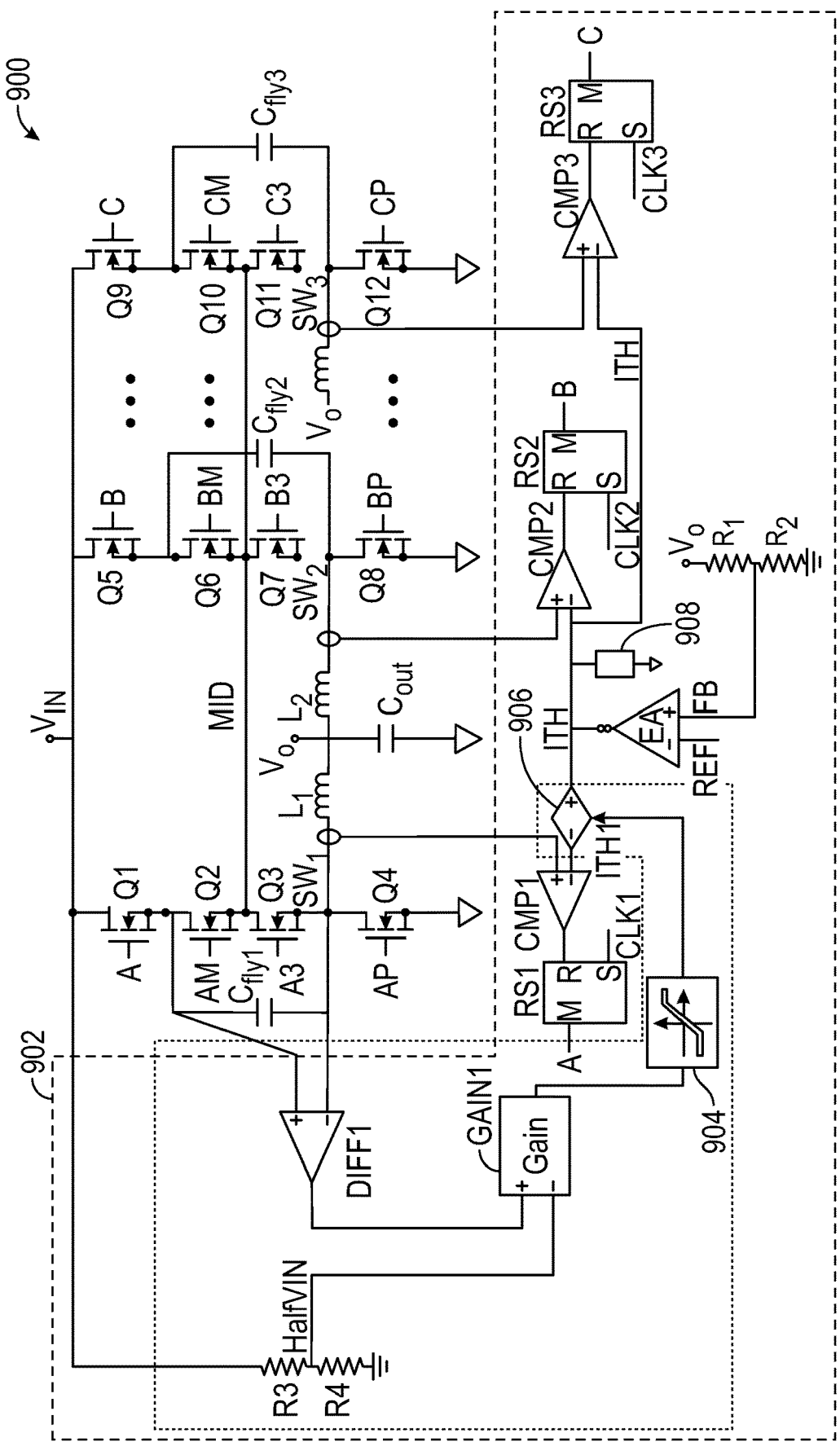
FIG. 17 is a schematic diagram of an example of a N-phase hybrid converter system.

FIG. 17 is a schematic diagram of an example of a N-phase hybrid converter system. The N-phase hybrid converter system 900 includes a N-phase hybrid converter and a PWM control circuit 902. The N-phase hybrid converter 900 of FIG. 17 is similar to the N-phase hybrid converter 700 of FIG. 13.

In the illustrated example, the PWM control circuit 902 includes a first resistor R1, a second resistor R2, an error amplifier EA, a half-range limiter 904, a controlled voltage source 906, an amplifier stability network 908, a first comparator CMP1, a second comparator CMP2, a second comparator CMP3, a first set/reset (S/R) latch RS1, a second S/R latch RS2, a third S/R latch RS3, a top voltage divider resistor R3, a bottom voltage divider resistor R3, a difference amplifier DIFF1, and a gain circuit GAIN1. Although one example of a PWM control circuit 902 is depicted, the teachings herein are applicable to PWM controllers implemented in a wide variety of ways. Accordingly, other implementations are possible.

As shown in FIG. 17, the top voltage divider resistor R3 and the bottom voltage divider resistor R4 are connected as a resistor divider that generates a voltage signal HALFVIN that is about equal to about half the input voltage VIN. Thus, R3 and R4 can have nominally equal resistance values.

The difference amplifier DIFF1 amplifies a voltage difference between the node between the switching elements Q1 and Q2 and the node between the switching elements Q3 and Q4, which is then applied to the gain circuit GAIN1 along with the voltage signal HALFVIN. The half-range limiter 904 serves to limit the output of the gain circuit GAIN1. In particular, when the output of the gain circuit GAIN1 is negative, the output of the half-range limiter 904 is zero. However, when the output of the gain circuit GAIN1 is positive, the output of the half-range limiter 904 tracks the input of the half-range limiter 904 until reaching the maximum allowed output value. The output of the half-range limiter 904 controls the controlled voltage source 906 to adjust the threshold ITH generated by the error amplifier EA. Thus, the controlled voltage source 906 generates an adjusted threshold ITH1 equal to about ITH minus an adjustment voltage set by the half-range limiter 904. In this manner, the PWM control circuit 902 can include a threshold adjustment circuit configured to generate an adjusted threshold signal ITH1 by adjusting the threshold signal ITH based on an input voltage VIN of the multi-phase hybrid converter 900.

The output voltage $V_O$ is divided down to generate a feedback signal FB using a resistor divider formed by the first resistor R1 and the second resistor R2. The feedback signal FB couples to the non-inverting input of the error amplifier EA, which can be implemented as a transconductance amplifier. A reference DC voltage REF is coupled to the inverting input of the error amplifier EA, and the error between FB and REF is converted as a current output used to set the threshold ITH. In this manner, the PWM control circuit 902 can include a threshold generation circuit configured to generate a threshold signal ITH based on a regulated output voltage of a multi-phase hybrid converter 900. The amplifier stability network 908 can be implemented in a wide variety of ways, such as using a resistor-capacitor (RC) compensation network for providing stability compensation.

The first comparator CMP1 compares an indication of the current of the first inductor L1 to the adjusted threshold ITH1. The second comparator CMP2 compares an indication of the current of the second inductor L2 to the threshold ITH, and the third comparator CMP3 compares an indication of the current of the third inductor L3 to the threshold ITH.

The first SR latch RS1 outputs a first PWM control signal A that is set when the first clock signal CLK1 is applied. When the first sensed inductor current signal is higher than ITH1, the output of the first comparator CMP1 resets the first PWM control signal A, which is the control signal of the first switching element Q1 and the third switching element Q3. Furthermore, the first PWM control signal A can be logically inverted to control the fourth switching element Q4.

The second SR latch RS2 outputs a second PWM control signal B that is set when the second clock signal CLK2 is applied. The phase shift of the second clock signal CLK2 with respect to the first clock signal CLK1 depends on the number of N phases in the system 900. When the second sensed inductor current signal is higher than ITH, the output of the second comparator CMP2 resets the second PWM control signal B, which is the control signal of the fifth switching element Q5 and the seventh switching element Q7. Furthermore, the second PWM control signal B can be logically inverted to control the eighth switching element Q8.

The third SR latch RS2 outputs a third PWM control signal C that is set when the third clock signal CLK3 is applied. When the third sensed inductor current signal is higher than ITH, the output of the third comparator CMP3 resets the third PWM control signal B, which is the control signal of the ninth switching element Q5 and the seventh switching element Q7. Furthermore, the second PWM control signal B can be logically inverted to control the eighth switching element Q8.

Various Notes

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more," In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following aspects, the terms "including" and "comprising" are open-ended, that is, a system, device, article, composition, formulation, or process that includes elements in addition to those listed after such a term in a aspect are still deemed to fall within the scope of that aspect. Moreover, in the following aspects, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e,g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the aspects. Also, in the above Detailed Description, various features may be grouped together to streamline the disclosure. This should not be interpreted as intending that an unclaimed disclosed feature is essential to any aspect. Rather, inventive subject matter may lie in less than all features of a particular disclosed embodiment. Thus, the following aspects are hereby incorporated into the Detailed Description as examples or embodiments, with each aspect standing on its own as a separate embodiment, and it is contemplated that such embodiments may be combined with each other in various combinations or permutations. The scope of the invention should be determined with reference to the appended aspects, along with the full scope of equivalents to which such aspects are entitled.

The claimed invention is:

1. A multi-phase hybrid converter comprising:
a first switched-capacitor circuit including a first switching element, a second switching element, and a first capacitor;
a first switching converter circuit including a third switching element, a fourth switching element, and a first inductor, wherein the second switching element is coupled with the third switching element;
a second switched-capacitor circuit including a fifth switching element, a sixth switching element, and a second capacitor;
a second switching converter circuit including a seventh switching element, an eighth switching element, and a second inductor, wherein the sixth switching element is coupled with the seventh switching element; and
a control circuit to:
control operation of the first switching converter circuit using a first timing phase and control operation of the second switching converter circuit using a second timing phase, wherein the first timing phase includes complementary first control signals, and wherein the second timing phase includes complementary second control signals; and
control operation of the first switching converter circuit and the second switching converter circuit using third control signals, the control circuit to generate one of the third control signals using one of the complementary first control signals and one of the complementary second control signals,
wherein the control circuit includes:
a first logic circuit to generate a first one of the third control signals using a first one of the complementary first control signals and a second one of the complementary second control signals; and
a second logic circuit to generate a second one of the third control signals using a second one of the complementary first control signals and a first one of the complementary second control signals, and
wherein the first capacitor is cross-coupled between the first switched-capacitor circuit and the second switching converter circuit.

2. The multi-phase hybrid converter of claim 1, wherein the second capacitor is connected between the second switched-capacitor circuit and the first switching converter circuit.

3. The multi-phase hybrid converter of claim 1, comprising:
a third switched-capacitor circuit including a ninth switching element, a tenth switching element, and a third capacitor; and
a third switching converter circuit including an eleventh switching element, a twelfth switching element, and a third inductor, wherein the tenth switching element is coupled with the eleventh switching element;
wherein the second capacitor is connected between the second switched-capacitor circuit and the third switching converter circuit,
wherein the third capacitor is connected between the third switched-capacitor circuit and the first switching converter circuit,
the control circuit to:
control operation of the third switching converter circuit using a third timing phase.

4. The multi-phase hybrid converter of claim 3, wherein the first inductor and the second inductor share a magnetic core.

5. The multi-phase hybrid converter of claim 4, further comprising:
a third inductor configured to share the magnetic core.
6. The multi-phase hybrid converter of claim 3, the control circuit to:
disable operation of at least the third switching converter circuit during a time period in which operation of the third switching converter circuit would otherwise be enabled.
7. The multi-phase hybrid converter of claim 1, comprising:
a fourth capacitor coupled between a reference voltage node and a first node between the second switching element and the third switching element; and
a fifth capacitor coupled between the reference voltage node and a second node that is between the sixth switching element and the seventh switching element.
8. The multi-phase hybrid converter of claim 7, comprising:
a network circuit coupled between the first node and the second node.
9. The multi-phase hybrid converter of claim 8, wherein the network circuit includes an electrical short coupled between the first node and the second node.
10. The multi-phase hybrid converter of claim 8, wherein the network circuit includes at least one element selected from the group consisting of: a resistive element, a capacitive element, and an inductive element.
11. The multi-phase hybrid converter of claim 1, the multi-phase hybrid converter to generate an output voltage that is less than an input voltage.
12. The multi-phase hybrid converter of claim 1, comprising:
a pulse-width modulation control circuit including:
a threshold generation circuit configured to generate a threshold signal based on a regulated output voltage of the multi-phase hybrid converter;
a threshold adjustment circuit configured to generate an adjusted threshold signal by adjusting the threshold signal based on an input voltage of the multi-phase hybrid converter;
a first comparator configured to compare a first inductor current of the multi-phase hybrid converter to the adjusted threshold signal; and
a first latch circuit configured to generate at least one first switch control signal based on an output of the first comparator.
13. The multi-phase hybrid converter of claim 12, wherein the pulse-width modulation control circuit further includes:
a second comparator configured to compare a second inductor current of the multi-phase hybrid converter to the threshold signal;
a second latch circuit configured to generate at least one second switch control signal based on an output of the second comparator;
a third comparator configured to compare a third inductor current of the multi-phase hybrid converter to the threshold signal; and
a third latch circuit configured to generate at least one third switch control signal based on an output of the third comparator.
14. A method of operating a multi-phase hybrid converter, the method comprising:
generating complementary first control signals to turn ON and OFF switching elements of a first switching converter circuit, wherein a first timing phase includes the complementary first control signals;
generating complementary second control signals to turn ON and OFF switching elements of a second switching converter circuit, wherein a second timing phase includes the complementary second control signals;
generating third control signals to turn ON and OFF switching elements of a first switched-capacitor circuit and a second switched-capacitor circuit, including:
generating, using a first logic circuit, a first one of the third control signals using a first one of the complementary first control signals and a second one of the complementary second control signals; and
generating, using a second logic circuit, a second one of the third control signals using a second one of the complementary first control signals and a first one of the complementary second control signals;
applying, according to a switching cycle having a switching frequency and a duty cycle, the complementary first control signals, the complementary second control signals, and the third control signals, the switching cycle including the first timing phase and the second timing phase;
generating a series of pulses by the first switching converter circuit, the second switching converter circuit, the first switched-capacitor circuit, and the second switched-capacitor circuit, to at least one LC circuit including at least one of an output capacitor and an input capacitor and at least one inductor;
adjusting the duty cycle of switching signals to adjust the series of pulses to set an output voltage across the output capacitor; and
providing the output voltage across the output capacitor as an output voltage of the multi-phase hybrid converter.
15. The method of claim 14, comprising:
generating complementary fourth control signals to turn ON and OFF switching elements of a third switching converter circuit, wherein a third timing phase includes the complementary third control signals; and
generating, using one of the complementary second control signals and one of the complementary third control signals, fifth control signals to turn ON and OFF switching elements of a third switched-capacitor circuit.
16. The method of claim 15, the method comprising:
disabling operation of at least the third switching converter circuit during a time period in which operation of the third switching converter circuit would otherwise be enabled.
17. A multi-phase hybrid converter comprising:
a first switched-capacitor circuit including a first switching element, a second switching element, and a first capacitor;
a first switching converter circuit including a third switching element, a fourth switching element, and a first inductor, wherein the second switching element is coupled with the third switching element;
a second switched-capacitor circuit including a fifth switching element, a sixth switching element, and a second capacitor;
a second switching converter circuit including a seventh switching element, an eighth switching element, and a second inductor, wherein the sixth switching element is coupled with the seventh switching element; and a control circuit to control operation of the first switching converter circuit using a first timing phase and control operation of the second switching converter circuit using a second timing phase, the control circuit to:
  generate complementary first control signals to turn ON and OFF switching elements of the first switching converter circuit;
  generate complementary second control signals to turn ON and OFF switching elements of the second switching converter circuit; and
  generate, using one of the complementary first control signals and one of the complementary second control signals, third control signals to turn ON and OFF switching elements of a first switched-capacitor circuit and a second switched-capacitor circuit,
wherein the control circuit includes:
  a first logic circuit to generate a first one of the third control signals using a first one of the complementary first control signals and a second one of the complementary second control signals; and
  a second logic circuit to generate a second one of the third control signals using a second one of the complementary first control signals and a first one of the complementary second control signals.

18. The multi-phase hybrid converter of claim 17, comprising:
  a third switched-capacitor circuit including a ninth switching element, a tenth switching element, and a third capacitor; and
  a third switching converter circuit including an eleventh switching element, a twelfth switching element, and a third inductor, wherein the tenth switching element is coupled with the eleventh switching element,
  the control circuit to:
  generate complementary fourth control signals to turn ON and OFF switching elements of the third switching converter circuit.

19. The multi-phase hybrid converter of claim 17, wherein the first inductor and the second inductor share a magnetic core.

* * * * *